United States Patent
He et al.

(10) Patent No.: US 12,499,644 B2
(45) Date of Patent: Dec. 16, 2025

(54) PERFORMANCE RECORDING METHOD AND APPARATUS IN VIRTUAL SCENARIO, DEVICE, STORAGE MEDIUM, AND PROGRAM PRODUCT

(71) Applicant: Tencent Technology (Shenzhen) Company Limited, Shenzhen (CN)

(72) Inventors: Jingjing He, Shenzhen (CN); Meng Qiu, Shenzhen (CN); Dancheng Zou, Shenzhen (CN); Boyi Liu, Shenzhen (CN); Yu Deng, Shenzhen (CN); Jieqi Xie, Shenzhen (CN); Cong Tian, Shenzhen (CN); Weijian Cui, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 169 days.

(21) Appl. No.: 18/379,103

(22) Filed: Oct. 11, 2023

(65) Prior Publication Data

US 2024/0037884 A1 Feb. 1, 2024

Related U.S. Application Data

(63) Continuation of application No. PCT/CN2022/133709, filed on Nov. 23, 2022.

(30) Foreign Application Priority Data

Mar. 10, 2022 (CN) .......................... 202210231332.5

(51) Int. Cl.
*G06T 19/20* (2011.01)
*G06T 3/40* (2006.01)
*G06T 13/40* (2011.01)

(52) U.S. Cl.
CPC ............. *G06T 19/20* (2013.01); *G06T 3/40* (2013.01); *G06T 13/40* (2013.01); *G06T 2219/2024* (2013.01)

(58) Field of Classification Search
CPC .......... G06T 19/20; G06T 3/40; G06T 13/40; G06T 2219/2024
See application file for complete search history.

(56) References Cited

U.S. PATENT DOCUMENTS 9,792,778 B2 * 10/2017 Irby, II ................ G07F 17/3223
10,423,716 B2 * 9/2019 Gevlich ................ G06F 40/169
(Continued)

FOREIGN PATENT DOCUMENTS

| CN | 110020903 A | 7/2019 |
| CN | 110213613 A | 9/2019 |

(Continued)

OTHER PUBLICATIONS

Tencent Technology, ISR, PCT/CN2022/133709, Feb. 20, 2023, 3 pgs.

*Primary Examiner* — Abderrahim Merouan
(74) *Attorney, Agent, or Firm* — Morgan, Lewis & Bockius LLP

(57) ABSTRACT

This application provides a method for playing a performance of a virtual object in a virtual scenario performed by an electronic device. The method includes: displaying a virtual object outfitted with a first performance costume in the virtual scenario; in response to a user operation for the virtual object, playing a first part of background audio and displaying a first performance action performed by the virtual object outfitted with the first performance costume corresponding to the first part of the background audio; and automatically replacing the first performance costume outfitted for the virtual object with a second performance costume outfitted for the virtual object in response to the (Continued)

background audio changing from the first part to a second part corresponding to the second performance costume.

20 Claims, 10 Drawing Sheets

(56) References Cited

U.S. PATENT DOCUMENTS

| | | | | |
|---|---|---|---|---|
| 10,992,902 | B2* | 4/2021 | Narayan | G06V 20/46 |
| 12,198,664 | B2* | 1/2025 | Berger | G06T 13/205 |
| 2007/0260984 | A1* | 11/2007 | Marks | A63F 13/65 |
| | | | | 715/706 |
| 2012/0258797 | A1 | 10/2012 | Cullen et al. | |
| 2018/0264362 | A1* | 9/2018 | Kitamura | A63F 13/42 |
| 2019/0236209 | A1 | 8/2019 | Bencar et al. | |
| 2020/0064141 | A1* | 2/2020 | Bell | G09B 21/006 |
| 2020/0187334 | A1* | 6/2020 | Crawford | G06F 3/011 |
| 2022/0095008 | A1* | 3/2022 | Otsuka | H04N 21/8146 |
| 2022/0270363 | A1* | 8/2022 | Gotoh | G06F 3/011 |
| 2022/0400022 | A1* | 12/2022 | Desai | G06V 40/107 |
| 2023/0066179 | A1* | 3/2023 | Berger | G06V 20/20 |
| 2023/0356085 | A1* | 11/2023 | Hall | A63F 13/44 |
| 2024/0037884 | A1* | 2/2024 | He | A63F 13/54 |
| 2025/0123799 | A1* | 4/2025 | Cherry | G10L 15/1822 |

FOREIGN PATENT DOCUMENTS

| | | |
|---|---|---|
| CN | 110300242 A | 10/2019 |
| CN | 110472099 A | 11/2019 |
| CN | 111489424 A | 8/2020 |
| CN | 112541959 A | 3/2021 |
| CN | 113113045 A | 7/2021 |

* cited by examiner

PERFORMANCE RECORDING METHOD AND APPARATUS IN VIRTUAL SCENARIO, DEVICE, STORAGE MEDIUM, AND PROGRAM PRODUCT

CROSS-REFERENCE TO RELATED APPLICATIONS

This application is a continuation application of PCT Patent Application No. PCT/CN2022/133709, entitled "PERFORMANCE RECORDING METHOD AND APPARATUS IN VIRTUAL SCENARIO, DEVICE, STORAGE MEDIUM, AND PROGRAM PRODUCT" filed on Nov. 23, 2022, which claims priority to Chinese Patent Application No. 202210231332.5, entitled "PERFORMANCE RECORDING METHOD AND APPARATUS IN VIRTUAL SCENARIO, DEVICE, STORAGE MEDIUM, AND PROGRAM PRODUCT" filed on Mar. 10, 2022, all of which is incorporated by reference in its entirety.

FIELD OF THE TECHNOLOGY

This application relates human-computer interaction technologies, and in particular, to a performance recording method and apparatus in a virtual scenario, a device, a storage medium, and a program product.

BACKGROUND OF THE DISCLOSURE

In a performance recording application of a virtual scenario (for example, a game), a user can control a virtual object to replace a performance costume (for example, a worn cloth or accessory) in a performance recording process. In related technologies, when replacing the performance costume of the virtual object in the performance recording process, many sets of performance costumes need to be first combined, and then the performance costume is manually replaced, resulting in low replacement efficiency of the performance costume, and low efficiency of human-computer interaction.

SUMMARY

Embodiments of this application provide a performance recording method and apparatus in a virtual scenario, a device, a computer-readable storage medium, and a computer program product, which can improve a replacement efficiency of a performance costume and improve efficiency of human-computer interaction.

The technical solutions in the embodiments of this application are implemented as follows:

An embodiment of this application provides a method for playing a performance of a virtual object in a virtual scenario performed by an electronic device, the method including:
  displaying a virtual object outfitted with a first performance costume in the virtual scenario;
  in response to a user operation for the virtual object, playing a first part of background audio and displaying a first performance action performed by the virtual object outfitted with the first performance costume corresponding to the first part of the background audio; and
  automatically replacing the first performance costume outfitted for the virtual object with a second performance costume outfitted for the virtual object in response to the background audio changing from the first part to a second part corresponding to the second performance costume.

An embodiment of this application provides an electronic device, including:
  a memory, configured to store executable instructions; and
  a processor, configured to execute the executable instructions and cause the electronic device to perform the aforementioned performance playing method in a virtual scenario provided in the embodiments of this application during execution of the executable instructions stored in the memory.

An embodiment of this application provides a non-transitory computer-readable storage medium, storing executable instructions, the executable instructions, when executed by a processor of an electronic device, causing the electronic device to implement the aforementioned performance playing method in a virtual scenario provided in the embodiments of this application.

The embodiments of this application have the following beneficial effects:

By applying the embodiments of this application, in a performance recording process of a virtual object in a virtual scenario, selected background audio of performance recording includes a variety of playback rhythms, and different playback rhythms are associated with different performance costumes. Therefore, as a playback rhythm of the background audio of the performance recording changes, a performance costume outfitted for the virtual object is automatically replaced, so that the performance costume of the virtual object corresponds to the playback rhythm of the background audio. In this way, in the performance recording process, the performance costume outfitted for the virtual object changes with the playback rhythm of the background audio, so that the performance costume outfitted for the virtual object and the playback rhythm of the background audio achieve a good echo, thereby improving an adaptation degree between the two. In addition, compared with that a replaced performance costume is manually switched, such a replacement manner of the performance costume greatly improves replacement efficiency of the performance costume, so that a user does not need to manually replace the performance costume of the virtual object under different playback rhythms, thereby improving efficiency of human-computer interaction.

DESCRIPTION OF EMBODIMENTS

Figure 1A:
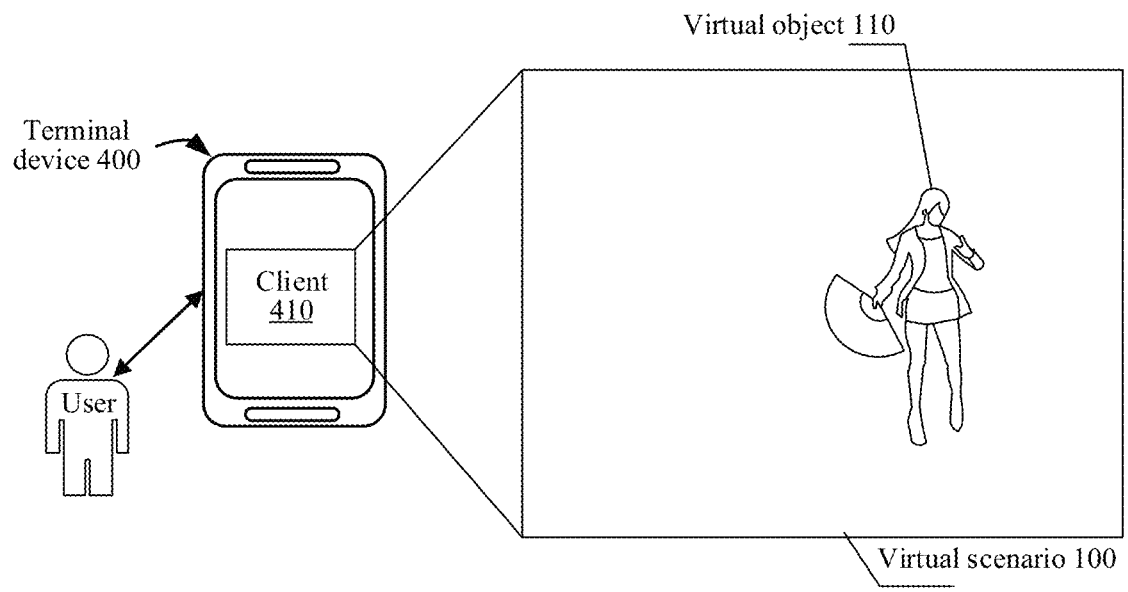
FIG. 1A is a schematic diagram of an application scenario of a performance recording method in a virtual scenario according to an embodiment of this application.

To make the objectives, technical solutions, and advantages of this application clearer, the following describes this application in detail with reference to the accompanying drawings. The described embodiments are not to be considered as a limitation to this application. All other embodiments obtained by a person of ordinary skill in the art without creative efforts shall fall within the protection scope of this application.

In the following descriptions, related "some embodiments" describe a subset of all possible embodiments. However, it may be understood that the "some embodiments" may be the same subset or different subsets of all the possible embodiments, and may be combined with each other without conflict.

In the following descriptions, the included term "first/second . . . " is merely intended to distinguish similar objects but does not necessarily indicate a specific order of an object. It may be understood that "first/second . . . " is interchangeable in terms of a specific order or sequence if permitted, so that the embodiments of this application described herein can be implemented in a sequence in addition to the sequence shown or described herein.

Unless otherwise defined, meanings of all technical and scientific terms used in this specification are the same as those usually understood by a person skilled in the art to which this application belongs. Terms used in this specification are merely intended to describe objectives of the embodiments of this application, but are not intended to limit this application.

Before the embodiments of this application are described in detail, nouns and terms involved in the embodiments of this application are described. The nouns and terms provided in the embodiments of this application are applicable to the following explanations.

1) Client: it is an application configured to provide various services and being run on a terminal, for example, a video playback client, and a game client.

2) "In response to": it is used for representing a condition or status on which one or more operations to be performed depend. When the condition or status is satisfied, the one or more operations may be performed immediately or after a set delay. Unless explicitly stated, there is no limitation on the order in which the plurality of operations are performed.

3) Virtual scenario: it is a virtual scenario displayed (or provided) when an application is running on a terminal. The virtual scenario may be a simulated environment of a real world, or may be a semi-simulated semi-fictional virtual environment, or may be an entirely fictional virtual environment. The virtual scenario may be any one of a two-dimensional virtual scenario, a 2.5-dimensional virtual scenario, or a three-dimensional virtual scenario, and the dimension of the virtual scenario is not limited in the embodiments of this application. For example, the virtual scenario may include the sky, the land, the ocean, or the like. The land may include environmental elements such as the desert and a city. A user may control a virtual object perform a movement in the virtual scenario.

4) Virtual object: it is an object that can perform interaction with various persons and things in a virtual scenario, or a movable object in a virtual scenario. The movable object may be a virtual character, a virtual animal, a cartoon character, or the like, for example, a character or an animal displayed in a virtual scenario. The virtual object may be a virtual image used for representing a user in the virtual scenario, the virtual scenario may include a plurality of virtual objects, and each virtual object has a shape and a volume in the virtual scenario, and occupies some space of the virtual scenario. The virtual object may be a game role controlled by a user (or a player), that is, the virtual object is controlled by a real user, and moves in the virtual scenario in response to operations of the real user on controllers (including a touch screen, a voice-activated switch, a keyboard, a mouse, a joystick, and the like). For example, when the real user moves the joystick to the left, the first virtual object moves to the left in the virtual scenario; and the user may also stay still, jump, and use various functions (such as skills and props).

Embodiments of this application provide a performance recording method and apparatus in a virtual scenario, an electronic device, a computer-readable storage medium, and a computer program product, which can improve a replacement efficiency of a performance costume and improve efficiency of human-computer interaction. To make the performance recording method in a virtual scenario provided in an embodiment of this application more comprehensible, an exemplary implementation scenario of the performance recording method in a virtual scenario provided in this embodiment of this application is first described, and a virtual scenario in the performance recording method in a virtual scenario provided in this embodiment of this application may be completely outputted based on the electronic device or may be collaboratively outputted based on the electronic device and a server. In some embodiments, the virtual scenario may be an environment for game roles to interact, for example, may be used for the game roles to battle in the virtual scenario. By controlling actions of the game roles, two parties may perform interaction in the virtual scenario, so that users can relieve their live pressure during the game.

In an implementation scenario, FIG. 1A is a schematic diagram of an application scenario of a performance recording method in a virtual scenario according to an embodiment of this application. The application scenario completely relies on a computing capability of graphics processing hardware of a terminal device 400 to complete calculation for relevant data of a virtual scenario 100. For example, a game in a stand-alone version/offline mode may complete outputs of virtual scenarios by terminal devices 400 of various types such as a smartphone, a tablet computer, and a virtual reality/augmented reality device. In an example, types of the graphics processing hardware may include a central processing unit (CPU) and a graphics processing unit (GPU).

When a visual perception of the virtual scenario 100 is formed, the terminal device 400 calculates data required for display through graphics computing hardware, completes loading, parsing and rendering of the display data, and outputs a video frame capable of forming the visual perception for the virtual scenario on graphics output hardware. For example, the terminal presents two-dimensional video frames on a display screen of the smartphone, or projects video frames that realize a three-dimensional display effect on lenses of augmented reality/virtual reality glasses. In addition, to enrich a perception effect, the terminal device 400 may also form one or more of an auditory perception, a tactile perception, a motion perception, and a taste perception by means of different hardware.

In an example, the terminal device 400 runs a client 410 (for example, a stand-alone game application), and outputs a virtual scenario 100 including role-playing in a running process of the client 410. The virtual scenario 100 is an environment for game roles to perform interaction, for example, may be a plain, a street, a valley, or the like for the game roles to battle against. The virtual scenario 100 includes a virtual object 110 on which performance recording is to be performed.

In an example, the terminal device 400 displays a virtual object outfitted with a performance costume and an audio control for selecting background audio; determines selected target audio as background audio of performance recording in response to an audio selection operation triggered based on the audio control, the target audio including at least two playback rhythms, and different playback rhythms being associated with different performance costumes; plays the background audio in a performance recording process of the virtual object, and displays a performance action performed by the virtual object following the background audio; and automatically replaces the performance costume outfitted for the virtual object when a playback rhythm of the background audio changes, the performance costume of the virtual object corresponding to the playback rhythm of the background audio. In this way, the selected background audio of the performance recording is associated with the performance costume corresponding to the playback rhythm. Therefore, as a playback rhythm of the background audio of the performance recording changes, the performance costume outfitted for the virtual object is automatically replaced, so that the performance costume of the virtual object corresponds to the playback rhythm of the background audio. Compared with that a replaced performance costume is manually switched, replacement efficiency of the performance costume is greatly improved, so that a user does not need to manually replace the performance costume of the virtual object under different playback rhythms, thereby improving efficiency of human-computer interaction.

Figure 1B:
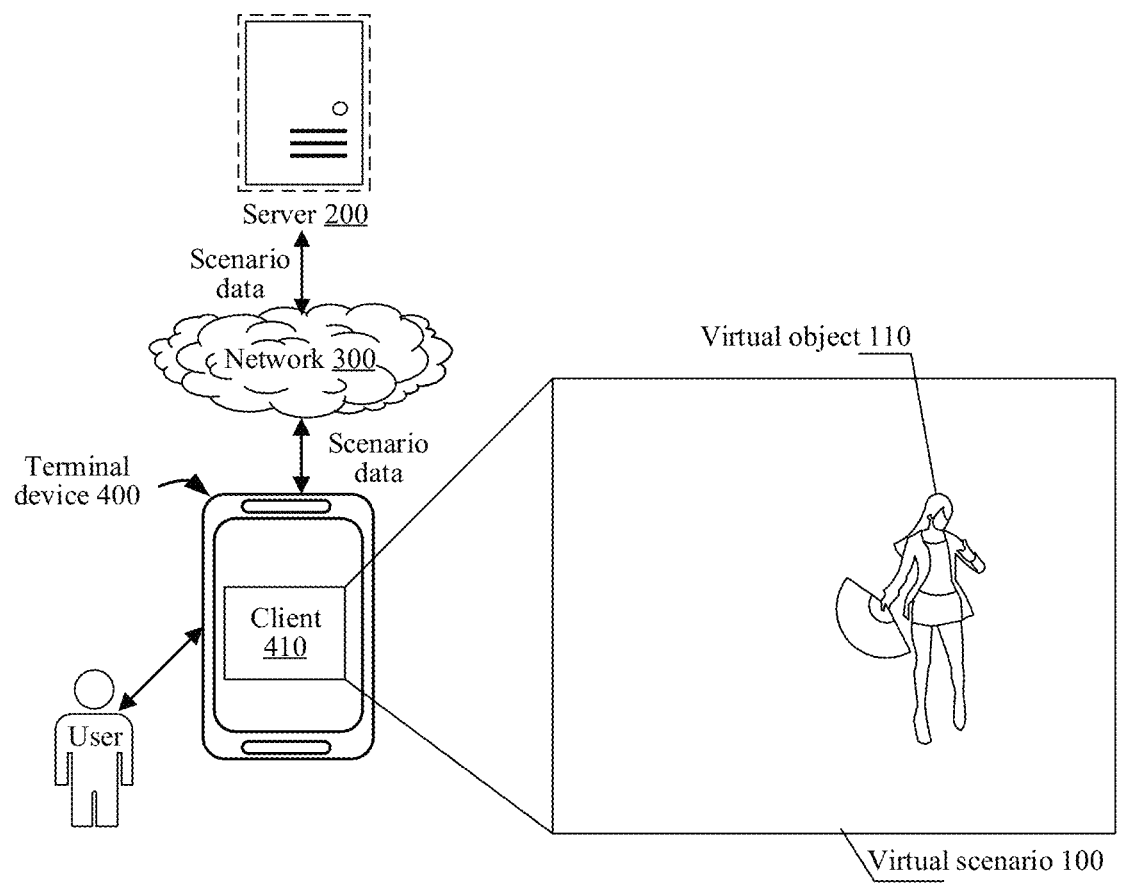
FIG. 1B is a schematic diagram of an application scenario of a performance recording method in a virtual scenario according to an embodiment of this application.

In another implementation scenario, FIG. 1B is a schematic diagram of an application scenario of a performance recording method in a virtual scenario according to an embodiment of this application. The application scenario includes a terminal device 400 and a server 200, and relies on a computing capability of the server 200 to complete calculation for a virtual scenario and outputs the virtual scenario on the terminal device 400. By using an example in which a visual perception of a virtual scenario 100 is formed, the server 200 calculates related display data (for example, scenario data) of the virtual scenario and send the data to the terminal device 400 through a network 300. The terminal device 400 relies on graphics computing hardware to complete loading, parsing and rendering of the display data, and relies on graphics output hardware to output the virtual scenario to form the visual perception. For example, the terminal may present two-dimensional video frames on a display screen of a smartphone, or project video frames that realize a three-dimensional display effect on lenses of augmented reality/virtual reality glasses. It may be understood that, the perception on the form of the virtual scenario may be outputted by means of corresponding hardware of the terminal device 400, for example, a microphone is used for forming an auditory perception, a vibrator is used for forming a tactile perception, and the like.

In an example, the terminal device 400 runs a client 410 (for example, a stand-alone game application), and outputs a virtual scenario 100 including role-playing in a running process of the client 410. The virtual scenario 100 is an environment for game roles to perform interaction, for example, may be a plain, a street, a valley, or the like for the game roles to battle against. The virtual scenario 100 includes a virtual object 110 on which performance recording is to be performed.

In some embodiments, this embodiment of this application may be implemented by a cloud technology. The cloud technology is a hosting technology that unifies a series of resources such as hardware, software, and networks in a wide area network or a local area network to implement computing, storage, processing, and sharing of data. The cloud technology is a collective name of a network technology, an information technology, an integration technology, a management platform technology, an application technology, and the like based on an application of a cloud computing business mode, and may form a resource pool, which is used as required, and is flexible and convenient. The cloud computing technology becomes an important support. A background service of a technical network system requires a large amount of computing and storage resources. For example, when a virtual scenario is a game scenario, a corresponding game is a cloud game, and pictures of the virtual scenario displayed by a terminal are rendered by a server.

In some embodiments, the terminal device 400 may implement the performance recording method in a virtual scenario provided in this embodiment of this application by running a computer program, for example, the computer program may be a native program or a software module in an operating system; may be a native application (APP), that is, a program that needs to be installed in the operating system to run, for example, a shooting game APP (namely, the above-mentioned client 410); may be an applet, that is, a program that can be run only by downloading the program into a browser environment; or may be a game applet that can be embedded into any APP. In summary, the above-mentioned computer program may be any form of an application, a module or a plug-in.

By using an example in which the computer program is an application, during actual implementation, an application supporting a virtual scenario is installed and run on the terminal device 400. The application may be any one of a first-person shooting (FPS) game, a third-person shooting game, a virtual reality application, a three-dimensional map program, an exercise simulation program, or a multiplayer gunfight survival game. The user uses the terminal device 400 to operate a virtual object in a virtual scenario to perform activities. The activities include, but not limited to, at least one of adjusting body postures, crawling, walking, running, riding, jumping, driving, picking, shooting, attacking, throwing, and building a virtual architecture. For example, the virtual object may be a virtual character such as a simulated character role or a cartoon character role.

In actual applications, the server 200 in FIG. 1B may be an independent physical server, or may be a server cluster or a distributed system formed by a plurality of physical servers, or may be a cloud server that provides basic cloud computing services such as a cloud service, a cloud database, cloud computing, a cloud function, cloud storage, a network service, cloud communication, a middleware service, a domain name service, a security service, a content delivery network (CDN), big data, and an artificial intelligence platform. The terminal device 400 may be a smartphone, a tablet computer, a notebook computer, a desktop computer, a smart speaker, a smartwatch, a wearable device, or the like, but is not limited thereto. The terminal device 400 and the server 200 may be directly or indirectly connected in a wired or wireless communication manner. This is not limited in this embodiment of this application.

Figure 2:
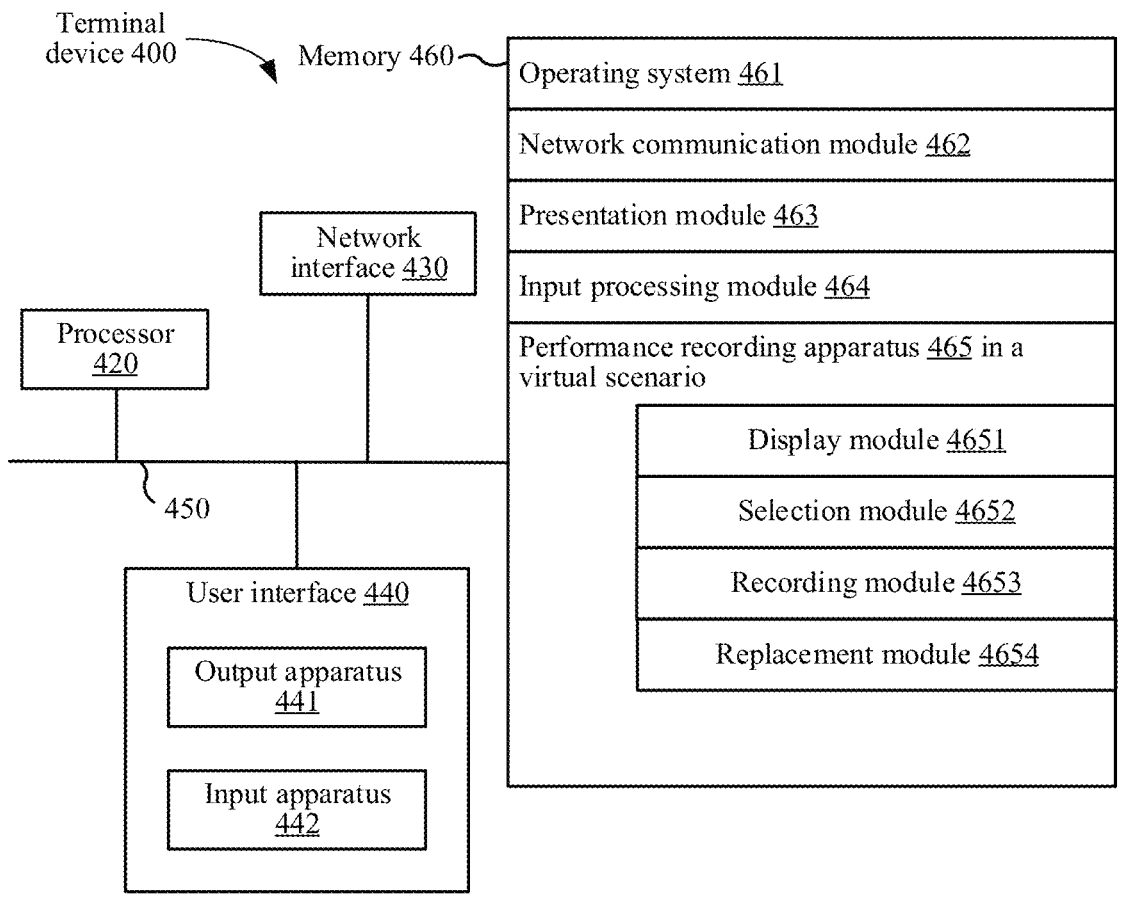
FIG. 2 is a schematic structural diagram of a terminal device 400 according to an embodiment of this application.

The electronic device that implements the performance recording method in a virtual scenario in this embodiment of this application is described below. In some embodiments, an electronic device 5 may be the terminal device shown in FIG. 1A or FIG. 1B, or the server shown in FIG. 1B. By using an example in which the electronic device is the terminal device 400 shown in FIG. 1A, a structure of the terminal device 400 shown in FIG. 1A is described. FIG. 2 is a schematic structural diagram of a terminal device 400 according to an embodiment of this application. The terminal device 400 shown in FIG. 2 includes: at least one processor 420, a memory 460, at least one network interface 430, and a user interface 440. All the components in the terminal device 400 are coupled together by a bus system 450. It may be understood that the bus system 450 is configured to implement connection and communication between these assemblies. In addition to a data bus, the bus system 450 further includes a power bus, a control bus, and a state signal bus. However, for ease of clear description, all types of buses are marked as the bus system 450 in FIG. 2.

The processor 420 may be an integrated circuit chip having a signal processing capability, for example, a general purpose processor, a digital signal processor (DSP), or another programmable logic device (PLD), a discrete gate, transistor logical device, or a discrete hardware component. The general purpose processor may be a microprocessor, any conventional processor, or the like.

The user interface 440 includes one or more output apparatuses 441 that can present media content, including one or more speakers and/or one or more visual display screens. The user interface 440 further includes one or more input apparatuses 442, including user interface components that facilitate inputting of a user, such as a keyboard, a mouse, a microphone, a touch display screen, a camera, and other input button and control.

The memory 460 may be a removable memory, a non-removable memory, or a combination thereof. Exemplary hardware devices include a solid-state memory, a hard disk drive, an optical disc driver, or the like. The memory 460 includes one or more storage devices physically remote from the processor 420.

The memory 460 includes a volatile memory or a non-volatile memory, or may include both a volatile memory and a non-volatile memory. The non-volatile memory may be a read-only memory (ROM). The volatile memory may be a random access memory (RAM). The memory 460 described in this embodiment of this application is to include any other suitable type of memories.

In some embodiments, the memory 460 may store data to support various operations. Examples of the data include a program, a module, and a data structure, or a subset or a superset thereof, which are described below by using examples.

An operating system 461 includes a system program configured to process various basic system services and perform a hardware-related task, for example, a framework layer, a core library layer, and a driver layer, and is configured to implement various basic services and process a hardware-based task;

A network communication module 462 is configured to reach another computing device through one or more (wired or wireless) network interfaces 430. Exemplary network interfaces 430 include: Bluetooth, wireless compatible authentication (WiFi), a universal serial bus (USB), and the like.

A presentation module 463 is configured to present information by using an output apparatus 441 (for example, a display screen or a speaker) associated with one or more user interfaces 440 (for example, a user interface configured to operate a peripheral device and display content and information).

An input processing module 464 is configured to detect one or more user inputs or interactions from one of the one or more input apparatuses 442 and translate the detected input or interaction.

In some embodiments, a performance recording apparatus in a virtual scenario provided in this embodiment of this application may be implemented by using software. FIG. 2 shows a performance recording apparatus 465 in a virtual scenario that is stored in the memory 460. The performance recording apparatus 465 in a virtual scenario may be software in a form such as a program and a plug-in, and includes the following software modules: a display module 4651, a selection module 4652, a recording module 4653, and a replacement module 4654. These modules are logical modules, and may be randomly combined or divided according to a function to be performed. The following describes a function of each module.

In some other embodiments, the performance recording apparatus in a virtual scenario provided in this embodiment of this application may be implemented by using hardware. For example, the performance recording apparatus in a virtual scenario provided in this embodiment of this application may be a processor in a form of a hardware decoding processor, programmed to perform the performance recording method in a virtual scenario provided in this embodiment of this application. For example, the processor in the form of the hardware decoding processor may use one or more application-specific integrated circuits (ASIC), a DSP, a programmable logic device (PLD), a complex programmable logic device (CPLD), a field-programmable gate array (FPGA), or other electronic components.

Figure 3:
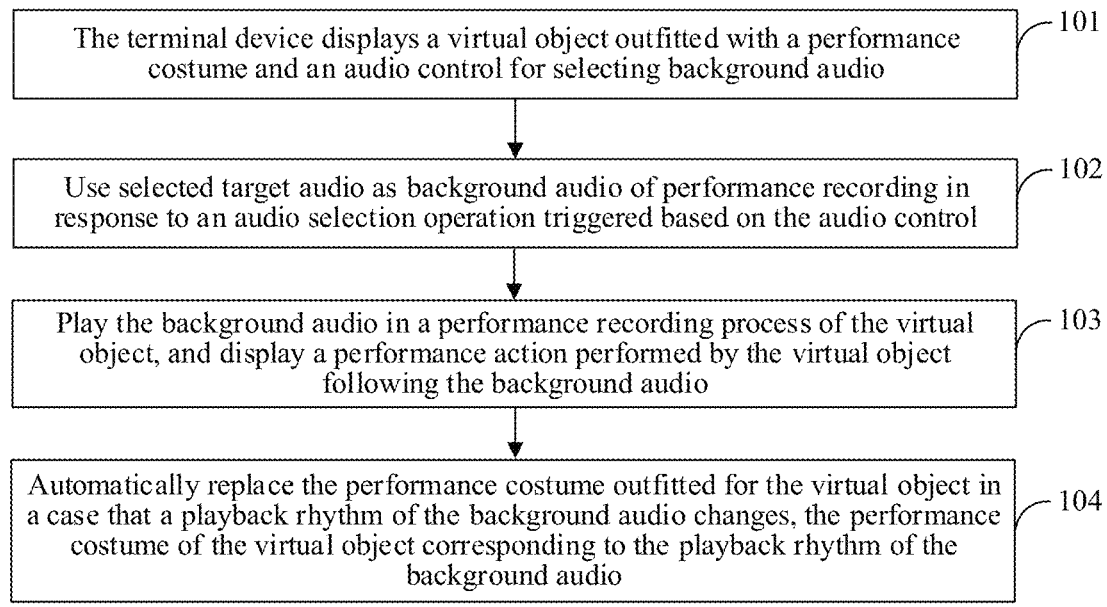
FIG. 3 is a schematic flowchart of a performance recording method in a virtual scenario according to an embodiment of this application.

The following describes the performance recording method in a virtual scenario provided in this embodiment of this application with reference to the accompanying drawings. The performance recording method in a virtual scenario provided in this embodiment of this application may be performed by the terminal device 400 alone in FIG. 1A, or may be collaboratively performed by the terminal device 400 and the server 200 in FIG. 1B. Next, an example in which the terminal device 400 in FIG. 1A alone performs the performance recording method in a virtual scenario provided in this embodiment of this application is used for description. FIG. 3 is a schematic flowchart of a performance recording method in a virtual scenario according to an embodiment of this application, which is described with reference to steps shown in FIG. 3.

It is to be noted that, the method shown in FIG. 3 can be performed by various forms of computer program run on the terminal device 400, not limited to the foregoing client 410. The operating system 461, the software module, and the script described above may also perform the method. Therefore, the client is not to be regarded as a limit on the embodiments of this application.

Step 101: The terminal device displays a virtual object outfitted with a performance costume and an audio control for selecting background audio.

On the terminal device, an application client (such as a game client) supporting a virtual scenario may be installed, or a client integrating with a virtual scenario function (such as an instant messaging client, a live broadcast client, or an education client) may be installed. When a user starts an application client on a terminal and the terminal runs the application client, the user may perform interaction between virtual objects based on a virtual scenario displayed by the client. For example, when the client is a game client, the user may perform interaction (such as a virtual battle) between game roles (virtual objects) in a game scenario based on a game screen displayed by the game client.

In actual applications, the user may control the virtual object to perform a performance in a virtual scenario based on the virtual scenario displayed by the client, and record the performance of the virtual object. In some embodiments, the user may record the performance of the virtual object based on a performance recording interface of the virtual scenario displayed by the terminal device, where the virtual object outfitted with the performance costume and the audio control for selecting the background audio may be displayed in the performance recording interface.

In actual applications, outfitting the virtual object in the virtual scenario with the performance costume refers to overlaying a model of the performance costume onto a corresponding location of a model of the virtual object.

Before starting performance recording, the user may first set the performance costume outfitted for the virtual object when performing performance recording on the virtual object in the virtual scenario. When starting the performance recording, the performance costume outfitted for the virtual object may be clothes or accessories that the virtual object was initially outfitted with (was outfitted with by default), the performance costume may be attached to or detachable from the virtual object, for example, the performance costume may be clothes (such as a coat and shoes) worn by the virtual object, or may be accessories (such as glasses, a necklace, and a helmet) worn by the virtual object, or may be a skin color, a hair color, a hairstyle style, and the like of the virtual object. In actual applications, the performance costume outfitted for the virtual object may exist in a form of a single costume accessory (such as one of clothes, shoes, and a hairstyle), or may be exist in a form of a costume set (for example, formed in a combination of clothes, shoes, and a hairstyle).

Step 102: Use selected target audio as background audio of performance recording in response to an audio selection operation triggered based on the audio control.

The target audio includes at least two playback rhythms, and different playback rhythms are associated with different performance costumes.

A playback rhythm of audio is described herein. The playback rhythm of audio refers to lengths and strength of mid-tones in audio movement, and is often compared to a skeleton of a musician. The playback rhythm of audio also refers to changes and repetition of sound beats, and has a sense of time. The playback rhythm includes both a beat and a speed, where the beat refers to regular alternating movement of music, namely, combination of beat points, while the speed refers to a rate of the rhythm.

When performing the performance recording, the background audio of the performance recording is selected by using the audio control. When the user clicks on the audio control, the terminal device displays a background audio selection interface in response to a click operation, and displays at least one selectable audio in the background audio selection interface. The user may select specific audio as the background audio through the background audio selection interface. For example, when the user selects the target audio, the target audio is used as the background audio of the performance recording.

It is to be noted that, in actual applications, in addition to being out-of-scenario audio (for example, the selected audio stored locally or audio stored in a network), the background audio may also be in-scenario audio, for example, audio in the virtual scenario of the performance recording. The in-scenario audio is a part of performance content being recorded, for example, in a performance recording process, the virtual object in the recorded performance content is singing, shouting, and the like; or is another audio in the virtual scenario except for audio emitted by the virtual object, for example, a sound that the virtual object uses a virtual prop to attack an enemy or another special effect audio. In this case, audio in such a virtual scenario is regarded as the in-scenario audio, in other words, the audio in the virtual scenario is regarded as the background audio. For the type, in the performance recording process, the terminal device may intelligently determine, according to a playback rhythm of the background audio, a performance costumes adapted to the playback rhythm, and automatically replace a performance costume outfitted for the virtual object when the playback rhythm of the background audio changes, so that the performance costume outfitted for the virtual object corresponds to the playback rhythm of the background audio.

In some embodiments, before the performance recording or before the using selected target audio as background audio of performance recording, the terminal device may establish an association relationship between the playback rhythm included in the target audio and the corresponding performance costume in the following manner: displaying an association setting interface of the target audio in response to an association setting operation for the target audio; displaying, in the association setting interface of the target audio, at least two performance costumes for association with the target audio, and rhythm indication information of the target audio, where the rhythm indication information is for indicating playback rhythms of the target audio; and establishing, in response to a performance costume association operation triggered based on the rhythm indication information, an association relationship between a target performance costume indicated by the performance costume association operation and a target playback rhythm.

Before the target audio is used as the background audio, a performance costume association setting needs to be performed on the target audio. For example, when the user clicks an audio association control, the terminal device receives the association setting operation for the target audio in response to a click operation; displays, in response to the association setting operation, the rhythm indication information of the target audio and at least two set performance costumes outfitted for the virtual object when performing performance recording on the virtual object; and may trigger a corresponding performance costume association operation based on the rhythm indication information of the target audio and the at least two candidate performance costumes, to establish an association relationship between a playback rhythm and a performance costume based on the performance costume association operation. For example, the performance costume association operation indicates to associate a playback rhythm 1 with a performance costume 1, that is, establish an association relationship between the playback rhythm 1 and the performance costume 1. In this way, in the performance recording process, when the playback rhythm of the target audio (background audio) changes to the playback rhythm 1, the performance costume originally outfitted for the virtual object (namely, the performance costume outfitted before the playback rhythm changes to the playback rhythm 1) is automatically replaced with the performance costume 1.

In some embodiments, before the displaying rhythm indication information of the target audio, the terminal device may perform rhythm point detection on the target audio, to obtain at least two rhythm points included in the target audio; and generate the rhythm indication information of the target audio based on each rhythm point.

A rhythm point of audio is also a beat and a drum point of the audio, where the beat refers to a combination law of strong beat and weak beat, and refers to a total length of notes in each measure in a music score. After obtaining the target audio, the terminal device performs rhythm point detection on the target audio, to obtain a plurality of rhythm points included in the target audio. For example, the terminal device performs sampling processing on the target audio based on sampling windows, to obtain audio data corresponding to a plurality of sampling windows; determines an energy spectrum corresponding to each sampling window based on audio data corresponding to each sampling window; and determines the plurality of rhythm points of the target audio based on the energy spectrum corresponding to each sampling window, to generate corresponding rhythm indication information based on each rhythm point. For example, rhythm indication information corresponding to a rhythm point 1 indicates that a rhythm is stronger, and rhythm indication information corresponding to a rhythm point 2 indicates that a rhythm is weaker.

When performing rhythm point detection, the terminal device may perform rhythm point detection on the audio data based on signal processing. In actual applications, if music is generally sampled by 44100 times per second, there are 44100 samples in one second. If 1024 samples are used as one window, there are about 44 windows in one second. In this case, 3-minute audio data has about 7920 windows, and according to an energy spectra of a sampling window, it is determined whether the sampling window is a rhythm point. In a rhythm point detection process, density of rhythms may also be adjusted by limiting a threshold, so that stronger rhythms can be detected and weaker rhythms can be ignored.

In some embodiments, the terminal device may determine rhythm points in the following manner: performing Fourier transform on the audio data corresponding to each sampling window, to obtain an audio spectrum corresponding to each sampling window; determining a difference degree between audio spectra corresponding to adjacent sampling windows in audio data of the target video; determining the energy spectrum corresponding to each sampling window based on the difference degree; separately obtaining energy spectra corresponding to sampling windows of a preset quantity from the plurality of sampling windows; weighting and averaging the energy spectra corresponding to the sampling windows of the preset quantity, to obtain a corresponding energy spectrum mean value; multiplying the energy spectrum mean value by a ratio coefficient, to obtain a corresponding energy spectrum threshold; and determining sampling windows corresponding to energy spectra greater than the energy spectrum threshold as the rhythm points.

In actual applications, the audio data is a messy waveform signal in a time domain. To facilitate analysis, the audio data in the time domain may be converted to a frequency domain through fast Fourier transform, to obtain the audio spectrum corresponding to the audio data; then the difference degree between audio spectra corresponding to adjacent sampling windows is calculated based on the obtained audio spectrum; and then the energy spectrum corresponding to each sampling window is determined based on a plurality of obtained difference degrees. For example, a difference degree obtained by subtracting an audio spectrum corresponding to a current sampling window from an audio spectrum corresponding to a previous adjacent sampling window is determined as an energy spectrum corresponding to the current sampling window.

In some embodiments, before the displaying, in the association setting interface of the target audio, at least two performance costumes for association with the target audio, the terminal device may determine the performance costumes for association with the target audio in the following manner: displaying a performance costume setting interface for setting the performance costume outfitted for the virtual object; displaying at least two selectable candidate performance costumes in the performance costume setting interface; and determining, in response to a selection operation for candidate performance costumes of a target quantity in the at least two candidate performance costumes, the candidate performance costumes of the target quantity as the performance costumes for association with the target audio.

The user may enter the performance costume setting interface by using the terminal device, and selects the performance costume based on the performance costume setting interface. In actual applications, in the performance costume setting interface, a plurality of candidate performance costumes may be provided for the user for selection of the user; and the user may select candidate performance costumes with a specific quantity to associate the target audio according to requirements. In some embodiments, for the quantity of candidate performance costumes selected by the user, there may be a quantity threshold, in other words, there is a maximum value for candidate performance costumes that the user can associate, for example, 10. During actual selection, the user may select any quantity that is within the maximum value but cannot exceed the maximum value.

Figure 4:
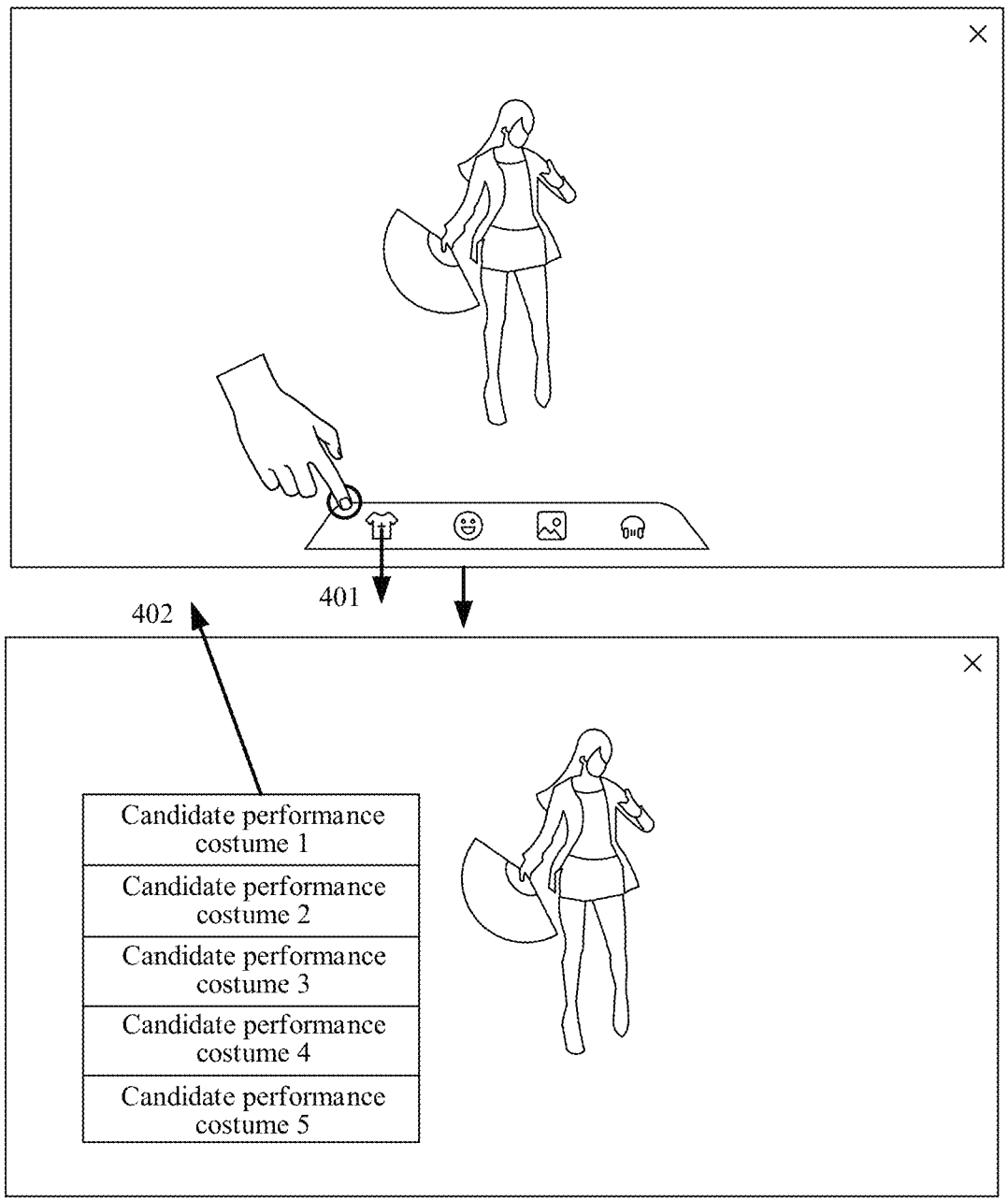
FIG. 4 is a schematic diagram of determining a performance costume according to an embodiment of this application.

FIG. 4 is a schematic diagram of determining a performance costume according to an embodiment of this application. The terminal device displays a costume control 401 for setting the performance costume outfitted for the virtual object in a performance recording interface. In response to a trigger operation for the costume control 401, the terminal device displays a performance costume setting interface 402; displays a plurality of candidate performance costumes in the performance costume setting interface 402, such as a candidate performance costume 1 to a candidate performance costume 5; and determines, in response to a selection operation for candidate performance costumes of a target quantity (for example, the candidate performance costume 2 to the candidate performance costumes 4), the candidate performance costume 2 to the candidate performance costume 4 as the performance costumes for association with the target audio.

In some embodiments, before the displaying, in the association setting interface of the target audio, at least two performance costumes for association with the target audio, the terminal device may determine the performance costumes for association with the target audio in the following manner: displaying a performance costume setting interface for setting the performance costume outfitted for the virtual object; displaying, when the performance costume is displayed in a form of a performance costume set, at least two types of selectable costume accessories in the performance costume setting interface; combining, in response to a selection operation for costume accessories of target types in the at least two types of costume accessories, the selected costume accessories of the target types; and determining a performance costume set obtained through combination as the performance costume for association with the target audio.

When the performance costume is displayed in the form of the performance costume set, the at least two types of selectable costume accessories, for example, a cloth-type costume accessory, a shoe-type costume accessory, a soak-type costume accessory, and a hairstyle-type costume accessory, are displayed in the performance costume setting interface; the costume accessories of the target types are selected and combined to obtain a plurality of performance costume sets, for example, the cloth-type costume accessory and the shoe-type costume accessory are selected and combined to obtain a performance costume set 1, and the shoe-type costume accessory, the soak-type costume accessory, and the hairstyle-type costume accessory are selected and combined to obtain a performance costume set 2; and the performance costume set 1 and the performance costume set 2 obtained through combination are determined as the performance costumes for association with the target audio.

In some embodiments, before the displaying, in the association setting interface of the target audio, at least two performance costumes for association with the target audio, the terminal device may determine the performance costumes for association with the target audio in the following manner: displaying a performance costume setting interface for setting the performance costume outfitted for the virtual object; displaying, when the performance costume is displayed in a form of a performance costume set, at least two accessory controls corresponding to the performance costume set in the performance costume setting interface, where different accessory controls correspond to different types of costume accessories; displaying, for a type corresponding to each accessory control, at least one candidate costume accessory corresponding to the type in response to a trigger operation for the accessory control; determining, in response to a selection operation for a target accessory in the at least one candidate costume accessory, the target accessory as an accessory selected for the type; and combining an accessory selected for each corresponding accessory control to obtain a corresponding performance costume set, and determining the obtained performance costume set as the performance costume for association with the target audio.

When the performance costume is displayed in the form of the performance costume set, the at least two accessory controls corresponding to the performance costume set are displayed in the performance costume setting interface, where different accessory controls correspond to different types of costume accessories, for example, a hairstyle control corresponds to a hairstyle accessory, and a cloth control corresponds to a cloth accessory. When each performance costume set is set, a corresponding setting manner may be used. For example, each performance costume set includes four costume accessories (corresponding to a hairstyle, clothes, soaks, and shoes). When a performance costume set 1 is set, when the user clicks the hairstyle control, a terminal displays, in response to a click operation, a plurality of selectable hairstyles, for example, a hairstyle 1, a hairstyle 2, and a hairstyle 3. When the user selects the hairstyle 3, the hairstyle 3 is used as a hairstyle accessory in the performance costume set 1. When the user clicks the cloth control, the terminal displays, in response to a click operation, a plurality of selectable clothes, for example, clothes 1, clothes 2, clothes 3, and clothes 4. When the user selects the clothes 2, the clothes 2 are used as a cloth accessory in the performance costume set 1. By analogy, it is assumed that socks 2 are selected as a sock accessory in the performance costume set 1, and shoes 1 are selected as a shoe accessory in the performance costume set 1. Finally, the hairstyle 3, the clothes 2, the socks 2, and the shoes 1 are combined, to obtain the performance costume set 1. In the manner, a performance costume set 2, . . . , a performance costume set N (where N>2, and may be set according to actual applications) can be obtained through combination, and finally the performance costume set 1, . . . , the performance costume set N may be used as the performance costumes outfitted for the virtual object when performance recording is performed on the virtual object in the virtual scenario.

It is to be noted that, when the performance costume set is set, in some embodiments, different performance costume sets may include different quantities of costume accessories, for example, the performance costume set 1 corresponds to three costume accessories (corresponds to a hairstyle, clothes, and socks), and the performance costume set 2 corresponds to four costume accessories (corresponds to a hairstyle, clothes, socks, and shoes), so that types of the costume accessories included in the performance costume set 1 and the performance costume set 2 may not be exactly the same. In some other embodiments, although different performance costume sets may include same quantities of costume accessories, but accessory types of the included costume accessories may be different, for example, the performance costume set 1 corresponds to four costume accessories (corresponds to a hairstyle, clothes, socks, and glasses), and the performance costume set 2 corresponds to four costume accessories (corresponds to a hairstyle, clothes, socks, and shoes), so that types of the costume accessories included in the performance costume set 1 and the performance costume set 2 may not be exactly the same. In some other embodiments, if a specific accessory control is not clicked, an accessory indicated by the accessory control is set to be empty by default. For example, when the performance costume set 1 is set, if the user does not click a hairstyle accessory, a hairstyle in the performance costume set 1 has not been set by default. In this case, the obtained hairstyle in the performance costume set 1 may be a default hairstyle of the virtual object.

In some embodiments, the terminal device may display the rhythm indication information of the target audio in the following manner: The terminal device displays a playback timeline of the target audio, where the playback timeline is for indicating current playback time and total playback duration of the target audio; and displays at least two rhythm point slots corresponding to the playback rhythms of the target audio in the playback timeline; and uses the rhythm point slots as the rhythm indication information, where the rhythm point slot is to be associated with a respective performance costume. Correspondingly, when the performance costume association operation is a drag operation for the target performance costume, the terminal device may establish, in response to the performance costume association operation triggered based on the rhythm indication information, the association relationship between the target performance costume indicated by the performance costume association operation and the target playback rhythm in the following manner: determining, when the target performance costume is dragged to a target rhythm point slot in response to the drag operation, a playback rhythm corresponding to the target rhythm point slot as the target playback rhythm, and establishing the association relationship between the target performance costume and the target playback rhythm corresponding to the target rhythm point slot.

In the playback timeline in the association setting interface of the target audio, the at least two rhythm point slots corresponding to the playback rhythms of the target audio are displayed (where the rhythm point slot is for bearing the to-be-associated performance costume, a location of the rhythm point slot is a location of a beat, a drumbeat, or a rhythm point of the target audio, and that a playback rhythm corresponding to the location changes refers to the location is a location of a replaced performance costume). In addition, in the association setting interface of the target audio, set performance costumes outfitted for the virtual object when performance recording is performed on the virtual object in the game, for example, a performance costume set 1, a performance costume set 2, a performance costume set 3, and a performance costume set 4, are displayed. When the user drags the target performance costume to the target rhythm point slot, the terminal device establishes, in response to the drag operation, the association relationship between the target performance costume and the target playback rhythm corresponding to the target rhythm point slot. For example, when the user drags the performance costume set 1 to a rhythm point slot 1, an association relationship between the performance costume set 1 and a playback rhythm corresponding to the rhythm point slot 1 is established. In the manner, an association relationship between a playback rhythm corresponding to each rhythm point slot and a corresponding performance costume may be established. After an association setting for the target audio is completed, the target audio may be used as the background audio to be applied to performance recording on the virtual object in a game.

In some embodiments, the terminal device may display the at least two performance costumes for association with the target audio and the rhythm indication information of the target audio in the following manner: The terminal device displays at least two change moments, where the change moments are moments at which the playback rhythms of the target audio change; displays, at an associated area of each change moment, rhythm indication information; and displays, in response to a selection operation for target rhythm indication information corresponding to a target change moment in the at least two change moments, at least one performance costume option corresponding to the target rhythm indication information, where each performance costume option corresponds to one performance costume.

Correspondingly, in response to a performance costume association operation triggered based on the rhythm indication information, the terminal device may establish the association relationship between the target performance costume indicated by the performance costume association operation and the target playback rhythm in the following manner: The terminal device controls, in response to a selection operation for a target performance costume option in at least two performance costume options, a target performance costume corresponding to the target performance costume option to be in a selected state; in response to a determining operation for the target performance costume, receives the performance costume association operation, namely, determines the determining operation for the target performance costume as the performance costume association operation; and establishes, in response to the performance costume association operation, the association relationship between the target performance costume and the target playback rhythm corresponding to the target change moment.

Figure 5:
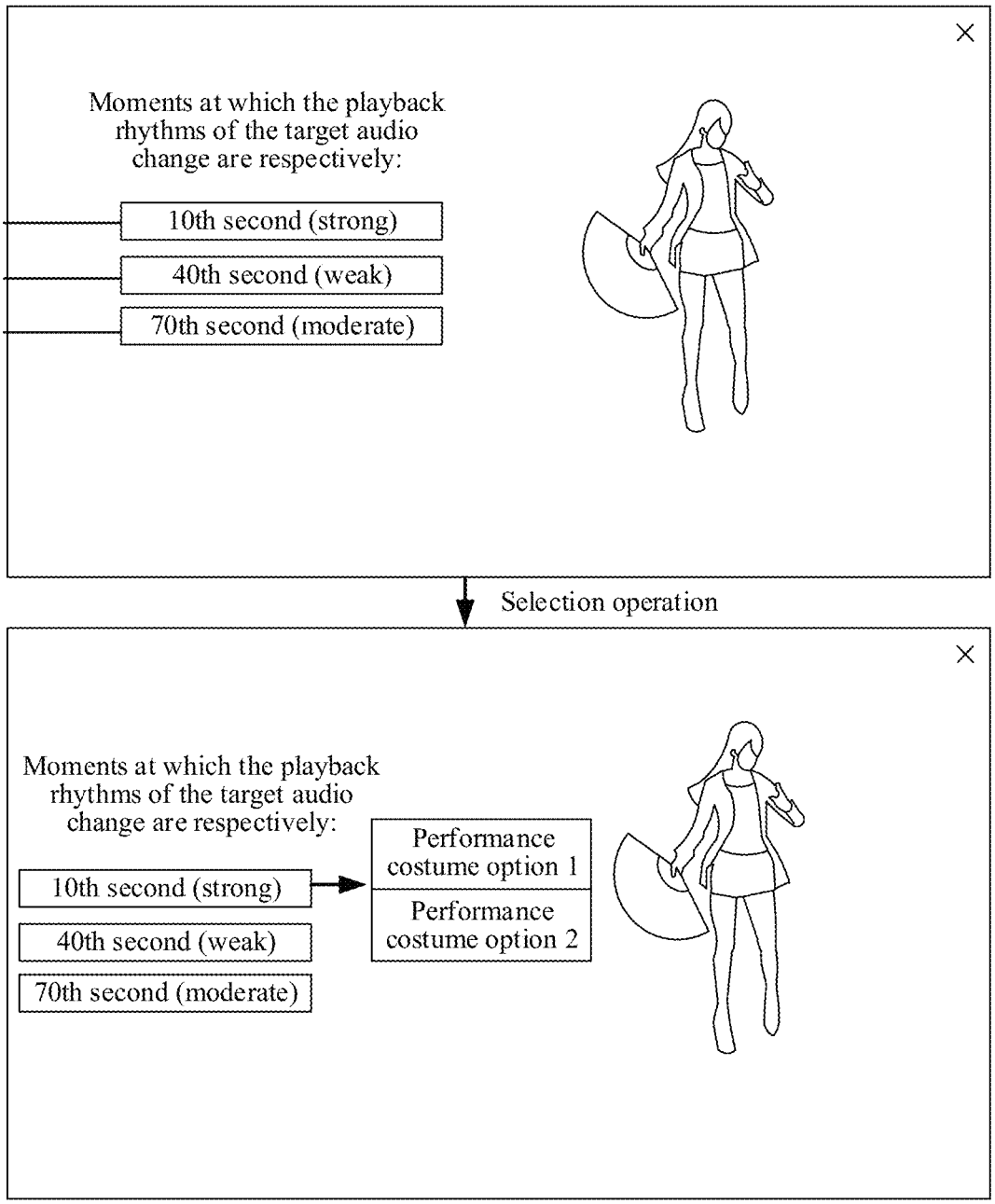
FIG. 5 is a schematic diagram of an association setting for background audio according to an embodiment of this application.

FIG. 5 is a schematic diagram of an association setting for background audio according to an embodiment of this application. In the association setting interface of the target audio, three change moments for indicating that the playback rhythms of the target audio change, for example, a 10th second, a 40th second, and a 70th second, are displayed; "strong" rhythm indication information 501 is displayed at an associated area of the 10th second; "weak" rhythm indication information 502 is displayed at an associated area of the second; and "moderate" rhythm indication information 503 is displayed at an associated area of the 70th second. When the user needs to perform a performance costume association setting on a playback rhythm at the 10th second, the terminal device displays, in response to a trigger operation for the rhythm indication information 501, at least one performance costume option corresponding to the "strong" rhythm indication information, where each performance costume option corresponds to one performance costume, for example, a performance costume option 1 corresponds to a performance costume set 1, and a performance costume option 2 corresponds to a performance costume set 2. When the user selects the performance costume option 1, an association relationship between the performance costume set 1 and a playback rhythm (strong) corresponding to the 10th second in the target audio is established. In this way, when the target audio is used as the background audio and is played to the 10th second, an outfit of a target virtual object is replaced with the performance costume set 1. In the manner, an association relationship between a playback rhythm (weak) corresponding to the 40th second in the target audio and a selected performance costume (for example, a performance costume set 3), and an association relationship between a playback rhythm (moderate) corresponding to the 70th second and a selected performance costume (for example, the performance costume set 2) may also be established. After an association setting for the target audio is completed, the target audio may be used as the background audio to be applied to performance recording on the virtual object in a game.

In some embodiments, the terminal device may display the rhythm indication information of the target audio in the following manner: displaying, in response to a selection operation for a target performance costume in the at least two performance costumes, at least one playback rhythm option corresponding to the target performance costume, and using each playback rhythm option as the rhythm indication information. Correspondingly, in response to a performance costume association operation triggered based on the rhythm indication information, the terminal device may establish the association relationship between the target performance costume indicated by the performance costume association operation and the target playback rhythm in the following manner: The terminal device controls, in response to a selection operation for a target playback rhythm option in the at least one playback rhythm option, a target playback rhythm corresponding to the target playback rhythm option to be in a selected state; in response to a determining operation for the target playback rhythm, receives the performance costume association operation, namely, determines the determining operation for the target playback rhythm as the performance costume association operation; and establishes, in response to the performance costume association operation, the association relationship between the target performance costume and the target playback rhythm.

In the association setting interface of the target audio, the at least two performance costumes for association with the target audio, for example, a performance costume set 1, a performance costume set 2, and a performance costume set 4, are displayed. When the user selects the target performance costume (for example, the performance costume set 2), at least one playback rhythm option adapted to the target performance costume is displayed, and each playback rhythm option is used as the rhythm indication information. For example, a playback rhythm option 1 indicates that a corresponding playback rhythm is strong, a playback rhythm option 2 indicates a corresponding playback rhythm is moderate, and a playback rhythm option 3 indicates that a corresponding playback rhythm is weak. When the user selects the playback rhythm option 3, an association relationship between the performance costume set 2 and the strong playback rhythm (corresponding to a known playback moment, for example, a 10th second of the target audio, in other words, when the target audio is used as the background audio and is played to the 10th second, an outfit of a target virtual object is replaced with the performance costume set 2) in the target audio may be established. In the manner, an association relationship between another performance costume and a playback rhythm that is adapted to in the target audio may be established. After an association setting for the target audio is completed, the target audio may be used as the background audio to be applied to performance recording on the virtual object in a game.

In some embodiments, the terminal device may display the at least two performance costumes for association with the target audio and the rhythm indication information of the target audio in the following manner: displaying at least two playback rhythms included in the target audio, and using the at least two playback rhythms as the rhythm indication information; and displaying recommendation information in response to a selection operation for a target playback rhythm in the at least two playback rhythms, where the recommendation information is for performing a recommendation setting on a performance costume associated with the target playback rhythm, and the recommendation information includes a recommended target performance costume. Correspondingly, in response to a performance costume association operation triggered based on the rhythm indication information, the terminal device may establish the association relationship between the target performance costume indicated by the performance costume association operation and the target playback rhythm in the following manner: in response to a determining operation for the recommendation information, receiving the performance costume association operation, namely, determining the determining operation for the recommendation information as the performance costume association operation; and establishing, in response to the performance costume association operation, the association relationship between the target performance costume and the target playback rhythm.

In the association setting interface of the target audio, the at least two playback rhythms included in the target audio are displayed, and the at least two playback rhythms are used as the rhythm indication information, for example, a playback rhythm 1 (corresponding to a known playback moment, for example, a 10th second of the target audio) indicates a strong playback rhythm, a playback rhythm 2 (corresponding to a known playback moment, for example, a 40th second of the target audio) indicates a moderate playback rhythm, and a playback rhythm 3 (corresponding to a known playback moment, for example, a 70th second of the target audio) indicates a weak playback rhythm. When the user selects the target playback rhythm (for example, the playback rhythm 1), recommendation information of the recommended target performance costume (for example, a performance costume set 2), for example, "Recommend to select the performance costume set 2", is displayed. The target performance costume is obtained through recommendation based on an adaption degree between the performance costume (for example, the foregoing performance costume set 1, . . . , the performance costume set N) outfitted for the virtual object when performance recording is performed on the virtual object in the virtual scenario and the target playback rhythm (for example, the playback rhythm 1), and a performance costume (for example, the performance costume set 2) whose adaption degree exceeds an adaption degree threshold is selected as the target performance costume included in the recommendation information. In actual applications, in addition to the recommendation information, a determining button and a replace button corresponding to the recommendation information may also be presented. When the user triggers the determining button, the terminal device may receive a determining operation for the recommendation information, namely, receive the performance costume association operation, and establish, in response to the performance costume association operation, the association relationship between the target playback rhythm (for example, the playback rhythm 1) and the target performance costume (for example, the performance costume set 2) included in the recommendation information. When the user triggers the replace button, the terminal device updates and displays new recommendation information in response to a trigger operation, where a target performance costume in the new recommendation information is different from a target performance costume (for example, the performance costume set 3) in original recommendation information. The user may use the target performance costume in the new recommendation information as the performance costume associated with the target playback rhythm. Certainly, when the user still does not satisfy the target performance costume in the new recommendation information, a corresponding replace button may be triggered to select a new target performance costume until the user satisfies. In the manner, an association relationship between another playback rhythm in the target audio and a performance costume that is adapted to may be established. After an association setting for the target audio is completed, the target audio may be used as the background audio to be applied to performance recording on the virtual object in a game.

In some embodiments, before the using selected target audio as background audio of performance recording, the terminal device may establish an association relationship between the playback rhythm included in the target audio and the corresponding performance costume in the following manner: The terminal device performs rhythm identification on the target audio, to obtain at least two playback rhythms corresponding to the target audio; obtains at least two performance costumes for performing an association setting on the background audio, and performs matching on each performance costume and each playback rhythm to obtain a corresponding matching degree; obtains at least two costume rhythm pairs whose matching degrees reach a matching degree threshold, where the costume rhythm pair includes one performance costume and one playback rhythm; and establishes an association relationship between a performance costume and a playback rhythm in each costume rhythm pair. The matching degree threshold may be set according to actual requirements, for example. 0.8.

In some embodiments, the terminal device may perform matching on each performance costume and each playback rhythm in the following manner: The terminal device obtains a style of each performance costume and a style of each playback rhythm, performs matching on the style of each performance costume and the style of each playback rhythm, and uses a matching result as a matching result of the performance costume and the playback rhythm. In actual applications, the style may include: gentle, cheerful, melancholic, relaxed, quiet, sad, or the like.

When a performance costume association setting is performed on the target audio, after obtaining the selected target audio, the terminal device automatically performs rhythm identification on the target audio to obtain the at least two playback rhythms corresponding to the target audio; performs matching on each playback rhythm and the performance costume (for example, a performance costume set 1, . . . , a performance costume set 4) that has been set by the user and that is outfitted for the virtual object when performance recording is performed on the virtual object in the virtual scenario, that is, performs pairwise matching on each playback rhythm and each performance costume, to obtain a plurality of costume rhythm pairs, for example, a costume rhythm pair 1 (a playback rhythm 1 and the performance costume set 1), a costume rhythm pair 2 (the playback rhythm 1 and the performance costume set 2), . . . , a costume rhythm pair 12 (a playback rhythm 3 and the performance costume set 4); obtains a matching degree of each costume rhythm pair, selects, for each playback rhythm, a costume rhythm pair with a greatest matching degree from costume rhythm pairs that include the playback rhythm, and establishes an association relationship between a performance costume and a playback rhythm in the costume rhythm pair, for example, for the playback rhythm 1 (corresponding to a known playback moment, for example, a 10th second of the target audio), a costume rhythm pair with a greatest matching degree is the costume rhythm pair 2 (the playback rhythm 1 and the performance costume set 2); and then establishes an association relationship between the playback rhythm 1 and the performance costume set 2 (to be specific, when performance recording is performed by using the target audio as the background audio, when the target audio is played to the 10th second, the performance costume outfitted for the virtual object is automatically replaced with the performance costume set 2. In the manner, an association relationship between another playback rhythm in the target audio and a performance costume that is adapted to may be established. After an association setting for the target audio is completed, the target audio may be used as the background audio to be applied to performance recording on the virtual object in a game.

In some embodiments, after obtaining the selected target audio, the terminal device may also input, to a machine learning model, the target audio and the performance costume (for example, the foregoing performance costume set 1, . . . , the performance costume set N) that has been set by the user and that is outfitted for the virtual object when performance recording is performed on the virtual object in the virtual scenario; and perform a performance costume association setting on the target audio through the machine learning model based on an artificial intelligence algorithm, so that an association setting result can be more intelligent and accurate, and performance costume association setting efficiency of the target audio can be improved, thereby improving replacement efficiency of the performance costume.

Step 103: Play the background audio in a performance recording process of the virtual object, and display a performance action performed by the virtual object following the background audio.

In a scenario application in which performance recording is performed on the virtual object in the virtual scenario, in the performance recording process, the background audio is played, and the performance action performed by the virtual object following the background audio is displayed. The performance action may include at least one action, and each action in the at least one action is continuous. For example, one action may be performed continuously and repeatedly, or an action sequence formed by a plurality of actions may be performed, where the plurality of actions included in the action sequence are continuous. In an example, the performance action may be a dance action (including a plurality of continuous dance actions), a martial art action (including a plurality of continuous martial art actions), a gymnastics action (including a plurality of continuous gymnastics actions), and the like.

Step 104: Automatically replace the performance costume outfitted for the virtual object when a playback rhythm of the background audio changes, the performance costume of the virtual object corresponding to the playback rhythm of the background audio.

In some embodiments, before the playback rhythm of the background audio changes, the terminal device may display the performance action performed by the virtual object following the background audio in the following manner: displaying a performance action performed by the virtual object outfitted with a first performance costume following the background audio. Correspondingly, when the playback rhythm of the background audio changes, the terminal device may automatically replace the performance costume outfitted for the virtual object in the following manner: obtaining a second performance costume associated with the playback rhythm of the background audio after the playback rhythm changes; and automatically replacing the performance costume outfitted for the virtual object from the first performance costume to the second performance costume, and displaying a performance action performed by the virtual object outfitted with the second performance costume following the background audio.

In some embodiments, when the playback rhythm of the background audio changes, the terminal device may also automatically replace the performance costume outfitted for the virtual object in the following manner: displaying a playback timeline of the background audio in a playback process of the background audio, and displaying, at a change moment at which the playback rhythm changes in the playback timeline, a target performance costume associated with the changed playback rhythm; and automatically replacing the performance costume outfitted for the virtual object with the target performance costume when the background audio is played to the change moment, and displaying a performance action performed by the virtual object outfitted with the target performance costume following the background audio, until the background audio is played to a next change moment.

Figure 6:
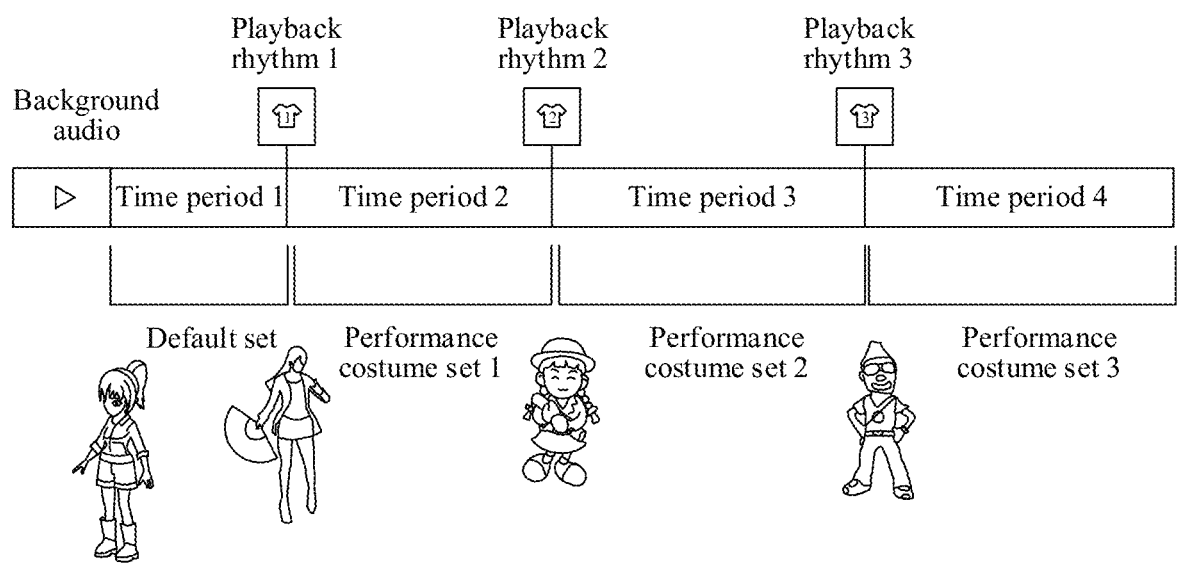
FIG. 6 is a schematic diagram of displaying performance recording according to an embodiment of this application.

FIG. 6 is a schematic diagram of displaying performance recording according to an embodiment of this application. At a change moment at which a playback rhythm changes in the playback timeline of the background audio, a target performance costume associated with the changed playback rhythm. For example, an associated performance costume set 1 is displayed at a playback rhythm 1 (strong), an associated performance costume set 2 is displayed at a playback rhythm 2 (moderate), and an associated performance costume set 3 is displayed at a playback rhythm 3 (weak). In a time period 1 in which the background audio is played to the playback rhythm 1, a costume outfitted for the virtual object is a default set. When the background audio is played to the playback rhythm 1, the costume outfitted for the virtual object is automatically replaced with the performance costume set 1, and a performance action performed by the virtual object outfitted with the performance costume set 1 following the background audio is displayed, until the background audio is played to the playback rhythm 2. When the background audio is played to the playback rhythm 2, the costume outfitted for the virtual object is automatically replaced from the performance costume set 1 to the performance costume set 2, and a performance action performed by the virtual object outfitted with the performance costume set 2 following the background audio is displayed, until the background audio is played to the playback rhythm 3. By analogy, in the playback process of the background audio, the costume outfitted for the virtual object is automatically controlled to be automatically replaced with a performance costume corresponding to a playback rhythm of the background audio at a corresponding beat based on a sequence of the background audio, to achieve an effect of switching an outfit instantly.

In some embodiments, the terminal device may also determine a picture scaling ratio adapted to the playback rhythm of the background audio when the performance costume outfitted for the virtual object is automatically replaced, where the picture scaling ratio is a scaling ratio of a performance picture recorded for the virtual object; and display, as the playback rhythm of the background audio changes, the recorded performance picture according to the determined picture scaling ratio, so that the picture scaling ratio of the performance picture corresponds to the playback rhythm.

For example, when entering performance recording, the rhythm indication information of the background audio is displayed in the performance recording interface, for example, the waveform diagram of the background audio selected by the user is used to inform an approximate rhythm curve of the background audio. When the performance recording has not yet started, the scaling ratio of the performance picture is 1.0, that is, no picture scaling is performed. After the user clicks to record, the background audio starts to be automatically played, and the performance picture is enlarged or reduced in real time according to a fluctuation of the waveform diagram indicated by the rhythm indication information. When the rhythm indication information indicates that the playback rhythm of the background audio is fast (for example, the waveform diagram of the background audio reaches a peak), it characterizes that the background audio enters a climax stage, and the scaling ratio of the performance picture reaches the maximum in this case, to match the current playback rhythm of the background audio. When the rhythm indication information indicates that the playback rhythm of the background audio is slow, a waveform of the background audio is relatively slow, and in this case, the scaling ratio of the performance picture gradually decreases, until the performance picture is reduced to a default 1.0 time. In this way, by scaling and adjusting the performance recording picture, between two different playback rhythms, even if the virtual object is outfitted with a same performance costume set, there are different display effects, thereby enriching display styles.

It may be understood that, scenario data related to the virtual scenario in the embodiments of this application is essentially relevant data of the user. When the embodiments of this application are applied to a specific product or technology, the user's permission or consent needs to be obtained, and collection, use, and processing of the relevant data need to comply with relevant laws, regulations, and standards of relevant countries and regions.

Figure 7:
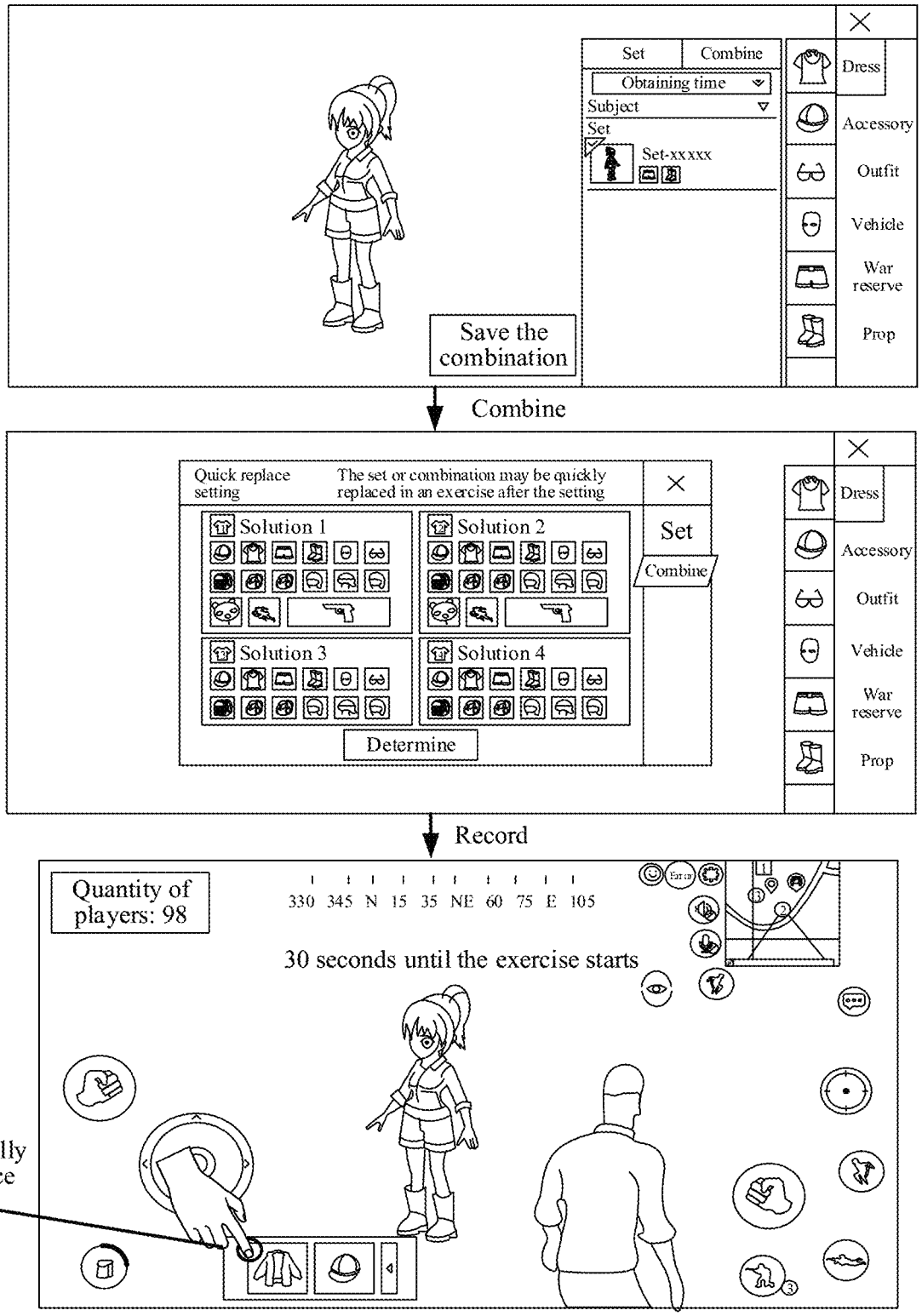
FIG. 7 is a schematic diagram of performance recording according to an embodiment of this application.

The following describes an exemplary application of this embodiment of this application in an actual application scenario. By using an example in which a virtual scenario is a game, FIG. 7 is a schematic diagram of performance recording according to an embodiment of this application. In the related art, before performance recording of the game, a player may combine performance costumes (for example, a hairstyle, clothes, pants, a bag, and a helmet), for example, click a warehouse to select costume accessories and combine the costume accessories. After a combination is saved, the combination may be saved by saving latest combined performance costumes to corresponding slots. Then, in a performance recording process, the combined performance costumes are selected on a birth island (for example, a corresponding performance costume setting button is clicked), so that a switch display between performance costumes in the game can be implemented. However, the manner requires the player to manually replace the outfitted performance costumes, resulting in low replacement efficiency.

Figure 8:
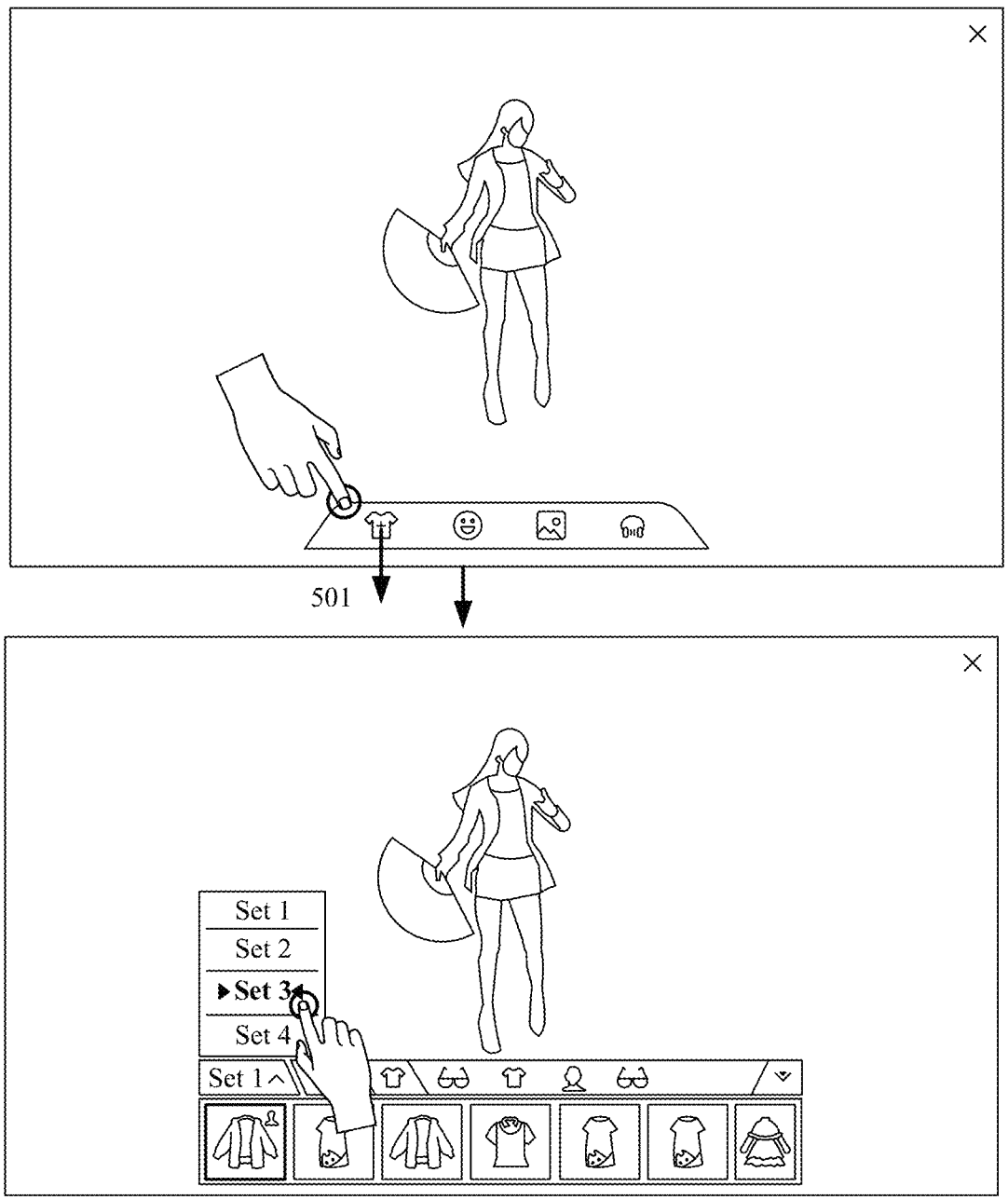
FIG. 8 is a schematic diagram of setting a performance costume according to an embodiment of this application.

In view of this, the embodiments of this application provide a performance recording method in a virtual scenario, to improve a replacement efficiency of a performance costume. In actual applications, before performance recording is performed in a virtual scenario, a performance costume outfitted for a virtual object (player) may be first set. Next, that the performance costume is displayed in a form of a performance costume set is described. FIG. 8 is a schematic diagram of setting a performance costume according to an embodiment of this application. After a virtual object enters a game dance room, when a user clicks a costume button 501, a terminal device displays a performance costume setting interface in response to a click operation. The user may set several sets of performance costume sets through the performance costume setting interface. For example, the user may combine costume accessories (for example, a hairstyle, clothes, shoes, socks, and accessories) in a first performance costume set through the performance costume setting interface, and after a combination is saved, the setting of the first performance costume set may be completed. Afterwards, by clicking a switch button, a subsequent second performance costume set, . . . , an $N^{th}$ (where N>2, and may be set according to actual applications) performance costume set are set in turn.

Figure 9:
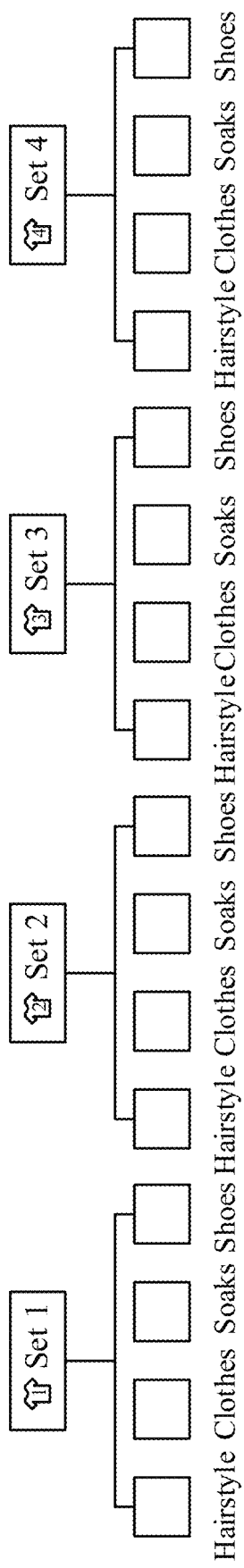
FIG. 9 is a schematic diagram of setting a performance costume according to an embodiment of this application.

Next, an example in which (N=4), namely, four performance costume sets are set is used for description. FIG. 9 is a schematic diagram of setting a performance costume according to an embodiment of this application. In a performance costume setting interface, four to-be-set performance costume sets, for example, a set 1, a set 2, a set 3, and a set 4 are displayed. Each performance costume set includes four costume accessories, in other words, each performance costume set corresponds to four accessory controls, where different accessory controls correspond to different types of costume accessories, for example, a hairstyle control corresponds to a hairstyle accessory, and a cloth control corresponds to a cloth accessory. When each performance costume set is set, the following operations are respectively performed on the four accessory controls associated with each performance costume set: displaying at least one candidate costume accessory corresponding to the type in response to a trigger operation for the accessory control; determining, in response to a selection operation for a target accessory in the at least one candidate costume accessory, the target accessory as an accessory correspondingly selected for the accessory control; and combining an accessory selected for each corresponding accessory control, to obtain a corresponding performance costume set.

For example, when the set 1 is set, when the user clicks the hairstyle control, a terminal displays, in response to a click operation, a plurality of selectable hairstyles, for example, a hairstyle 1, a hairstyle 2, and a hairstyle 3. When the user selects the hairstyle 3, the hairstyle 3 is used as a hairstyle accessory in the set 1. When the user clicks the cloth control, the terminal displays, in response to a click operation, a plurality of selectable clothes, for example, clothes 1, clothes 2, clothes 3, and clothes 4. When the user selects the clothes 2, the clothes 2 are used as a cloth accessory in the set 1. By analogy, it is assumed that socks 2 are selected as a sock accessory in the set 1, and shoes 1 are selected as a shoe accessory in the set 1. Finally, the hairstyle 3, the clothes 2, the socks 2, and the shoes 1 are combined, to obtain the set 1. In the manner, a set 2, a set 3, and a set 4 can be obtained through combination, and finally the set 1, the set 2, the set 3, and the set 4 may be used as the performance costumes outfitted for the virtual object when performance recording is performed on the virtual object in the virtual scenario.

It is to be noted that, when the user sets a set, if a specific accessory control is not clicked, an accessory indicated by the accessory control is set to be empty by default. For example, when the set 1 is set, if the user does not click the hairstyle control, a hairstyle in the set 1 has not been set by default. In this case, the obtained hairstyle in the set 1 may be a default hairstyle of the virtual object.

Figure 10:
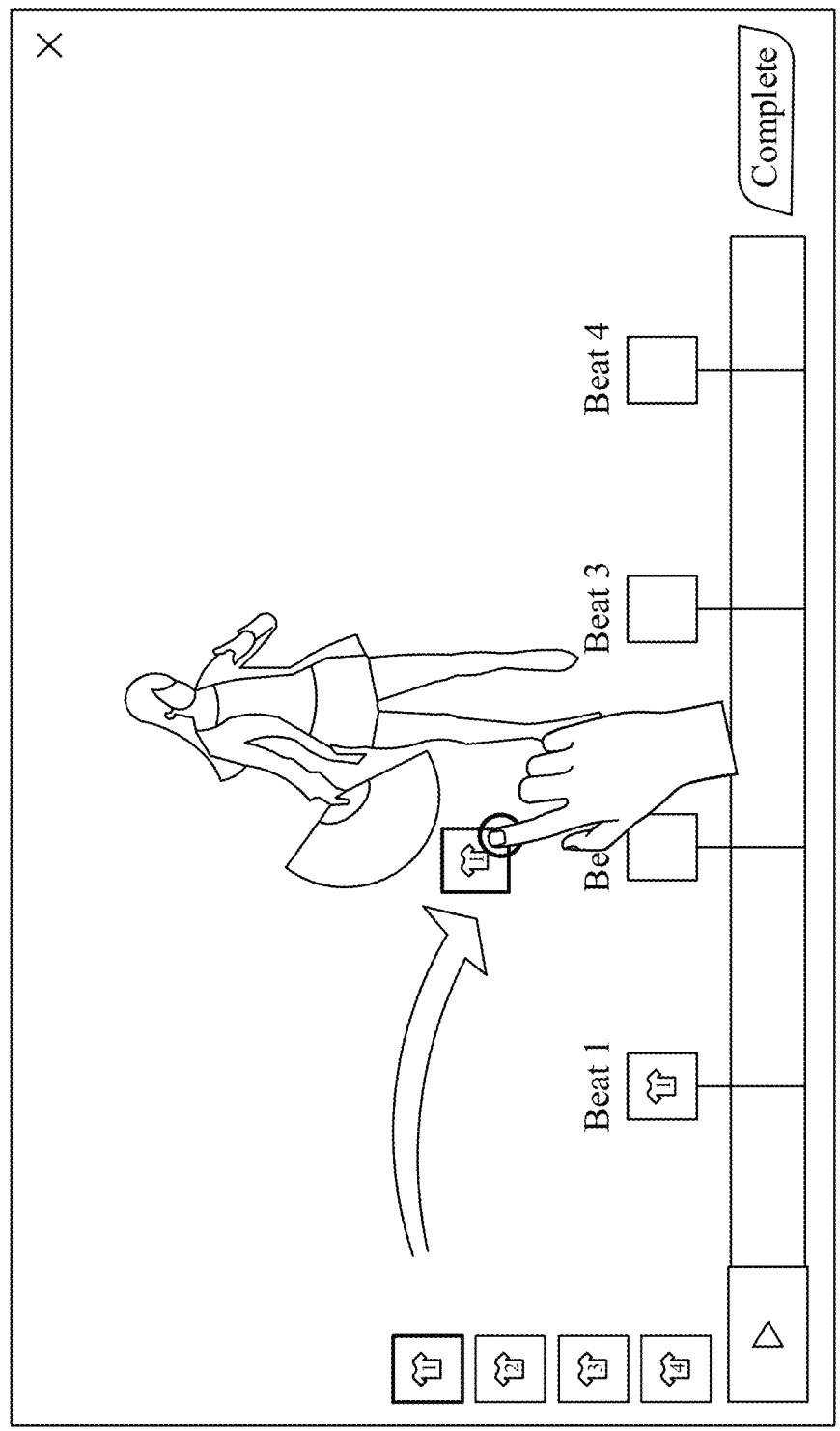
FIG. 10 is a schematic diagram of an association setting for background audio according to an embodiment of this application.

In actual applications, before performance recording is performed in the virtual scenario, a performance costume association setting may also be performed on a background audio used for performance recording. FIG. 10 is a schematic diagram of an association setting for background audio according to an embodiment of this application. After a virtual object enters a game dance room, when a user clicks an audio button, a terminal device displays a background audio selection interface in response to a click operation. A plurality of pieces of selectable audio are displayed in the background audio selection interface. The user may select specific audio as the background audio through the background audio selection interface. For example, when the user selects the target audio, the target audio is used as the background audio of the performance recording. Next, that a performance costume association setting is performed on the target audio is described.

When the user clicks a costume replace button (the foregoing audio association control), the terminal device receives an association setting operation for the target audio in response to a click operation; performs rhythm point detection on the target audio in response to the association setting operation, to obtain a plurality of rhythm points included in the target audio; and displays, in a playback timeline in an association setting interface of the target audio, at least two rhythm point slots corresponding to playback rhythms of the target audio (where the rhythm point slot is to be associated with a respective performance costume, a location of the slot is a location of a beat, a drumbeat, or a rhythm point of the target audio, and that a playback rhythm corresponding to the location changes refers to the location is a location of a replaced performance costume). In addition, in the association setting interface of the target audio, set performance costumes outfitted for the virtual object when performance recording is performed on the virtual object in the game, for example, the set 1, the set 2, the 3, and the set 4 that are obtained through combination, are displayed. When the user drags a target performance costume to a target rhythm point slot, the terminal device establishes, in response to a drag operation, an association relationship between the target performance costume and a target playback rhythm corresponding to the target rhythm point slot. For example, when the user drags the set 1 to a slot of a beat 1, an association relationship between the set 1 and the beat 1 is established.

In the manner, an association relationship between a playback rhythm corresponding to each rhythm point slot and a corresponding performance costume may be established. After an association setting for the target audio is completed, the target audio may be used as the background audio to be applied to performance recording on the virtual object in a game.

When a main interface is returned to start performance recording, if the target audio is selected as the background audio of the performance recording, the background audio is played, and a performance action performed by the virtual object following the background audio is displayed; and the performance costume outfitted for the virtual object is automatically replaced when a playback rhythm of the background audio changes, so that the performance costume of the virtual object corresponds to the playback rhythm of the background audio. For example, a playback timeline of the background audio is displayed in a playback process of the target audio, and at a change moment at which the playback rhythm changes in the playback timeline, a target performance costume associated with the changed playback rhythm is displayed. The performance costume outfitted for the virtual object is automatically replaced with the target performance costume when the background audio is played to the change moment, and a performance action performed by the virtual object outfitted with the target performance costume following the background audio is displayed, until the background audio is played to a next change moment.

Figure 11:
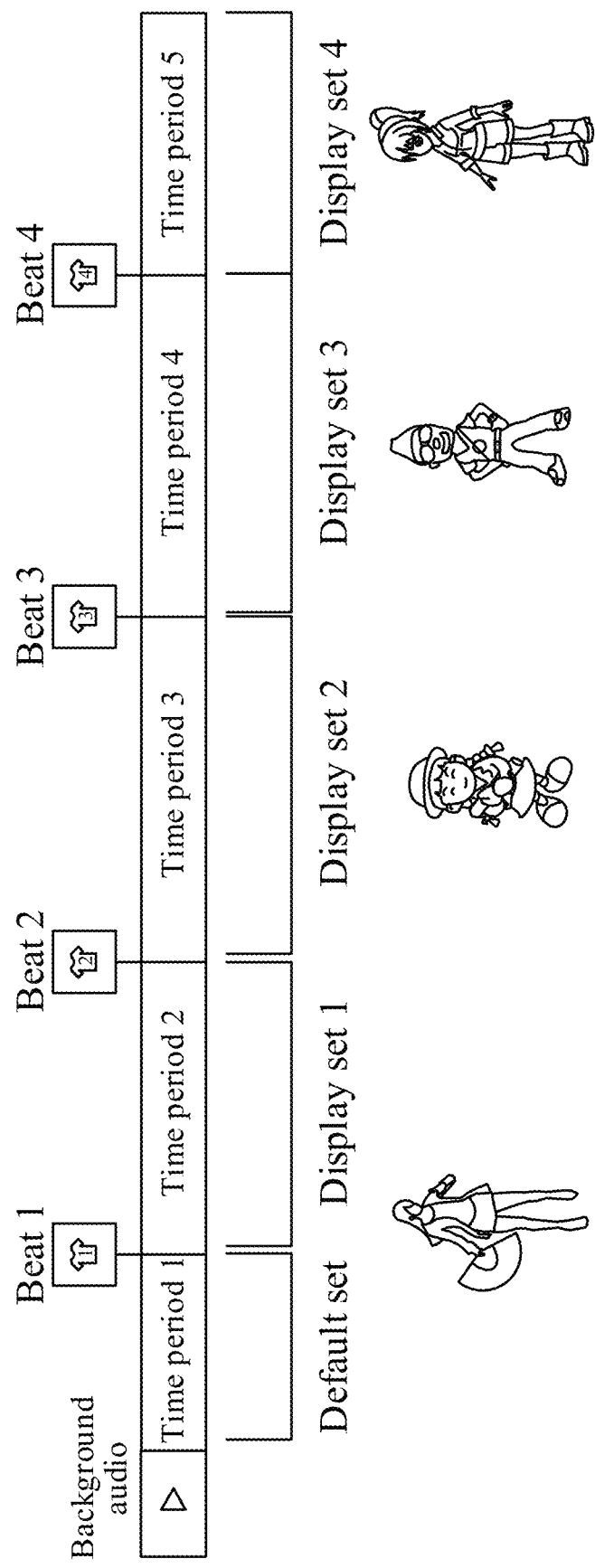
FIG. 11 is a schematic diagram of displaying performance recording according to an embodiment of this application.

FIG. 11 is a schematic diagram of displaying performance recording according to an embodiment of this application. At a change moment at which a playback rhythm changes in the playback timeline of the background audio, a target performance costume associated with the changed playback rhythm. For example, an associated set 1 is displayed at a beat 1, an associated set 2 is displayed at a beat 2, an associated set 3 is displayed at a beat 3, and an associated set 4 is displayed at a beat 4. In a time period 1 in which the background audio is played to the beat 1, a costume outfitted for the virtual object is a default set. When the background audio is played to the beat 1, the costume outfitted for the virtual object is automatically replaced with the set 1, and a performance action performed by the virtual object outfitted with the set 1 following the background audio is displayed, until the background audio is played to the beat 2. When the background audio is played to the beat 2, the costume outfitted for the virtual object is automatically replaced from the set 1 to the set 2, and a performance action performed by the virtual object outfitted with the set 2 following the background audio is displayed, until the background audio is played to the beat 3. By analogy, in the playback process of the background audio, the costume outfitted for the virtual object is automatically controlled to be automatically replaced with a performance costume corresponding to a playback rhythm of the background audio at a corresponding beat based on a sequence of the background audio, to achieve an effect of switching an outfit instantly.

By applying the embodiments of this application, in a performance recording process in a virtual scenario, selected background audio of performance recording includes a variety of playback rhythms, and different playback rhythms are associated with different performance costumes. Therefore, as a playback rhythm of the background audio of the performance recording changes, a performance costume outfitted for the virtual object is automatically replaced, so that the performance costume of the virtual object corresponds to the playback rhythm of the background audio. In this way, in the performance recording process, the performance costume outfitted for the virtual object changes with the playback rhythm of the background audio, so that the performance costume outfitted for the virtual object and the playback rhythm of the background audio achieve a good echo, thereby improving an adaptation degree between the two. In addition, compared with that a replaced performance costume is manually switched, such a replacement manner of the performance costume greatly improves replacement efficiency of the performance costume.

The following continuously describes an exemplary structure that a performance recording apparatus 465 in a virtual scenario provided in the embodiments of this application is implemented as software modules. In some embodiments, the software modules in the performance recording apparatus 465 in a virtual scenario stored in a memory 460 in FIG. 2 may include:

- a display module 4651, configured to display a virtual object outfitted with a performance costume and an audio control for selecting background audio;
- a selection module 4652, configured to use selected target audio as background audio of performance recording in response to an audio selection operation triggered based on the audio control,
- the target audio including at least two playback rhythms, and different playback rhythms being associated with different performance costumes;
- a recording module 4653, configured to play the background audio in a performance recording process of the virtual object, and display a performance action performed by the virtual object following the background audio; and
- a replacement module 4654, configured to automatically replace the performance costume outfitted for the virtual object when a playback rhythm of the background audio changes, the performance costume of the virtual object corresponding to the playback rhythm of the background audio.

In some embodiments, the apparatus further includes: an association establishment module, configured to display, before the using selected target audio as background audio of performance recording, an association setting interface of the target audio in response to an association setting operation for the target audio; display, in the association setting interface of the target audio, at least two performance costumes for association with the target audio, and display rhythm indication information of the target audio, where the rhythm indication information is for indicating playback rhythms of the target audio; and establish, in response to a performance costume association operation triggered based on the rhythm indication information, an association relationship between a target performance costume indicated by the performance costume association operation and a target playback rhythm.

In some embodiments, the apparatus further includes: a first costume determining module, configured to display, before the displaying at least two performance costumes for association with the target audio, a performance costume setting interface, where the performance costume setting interface is for setting the performance costume outfitted for the virtual object; display at least two selectable candidate performance costumes in the performance costume setting interface; and determine, in response to a selection operation for candidate performance costumes of a target quantity in the at least two candidate performance costumes, the candidate performance costumes of the target quantity as the performance costumes for association with the target audio.

In some embodiments, the apparatus further includes: a second costume determining module, configured to display, before the displaying at least two performance costumes for association with the target audio, a performance costume setting interface for setting the performance costume outfitted for the virtual object; display, when the performance costume is displayed in a form of a performance costume set, at least two types of selectable costume accessories in the performance costume setting interface; combine, in response to a selection operation for costume accessories of target types in the at least two types of costume accessories, the selected costume accessories of the target types; and determine a performance costume set obtained through combination as the performance costume for association with the target audio.

In some embodiments, the apparatus further includes: a third costume determining module, configured to display, before the displaying at least two performance costumes for association with the target audio, a performance costume setting interface for setting the performance costume outfitted for the virtual object; display, when the performance costume is displayed in a form of a performance costume set, at least two accessory controls corresponding to the performance costume set in the performance costume setting interface, where different accessory controls correspond to different types of costume accessories; display, for a type corresponding to each accessory control, at least one candidate costume accessory corresponding to the type in response to a trigger operation for the accessory control; determine, in response to a selection operation for a target accessory in the at least one candidate costume accessory, the target accessory as an accessory selected for the type; and combine an accessory selected for each type to obtain a corresponding performance costume set, and determine the performance costume set as the performance costume for association with the target audio.

In some embodiments, the association establishment module is configured to display a playback timeline of the target audio, display at least two rhythm point slots corresponding to the playback rhythms of the target audio in the playback timeline, and use the rhythm point slots as the rhythm indication information, where the rhythm point slot is to be associated with a respective performance costume; and receive a drag operation for a target performance costume in the at least two performance costumes, and determine the drag operation as the performance costume association operation when the drag operation indicates the target performance costume to be dragged to a target rhythm point slot; and establishing, in response to the performance costume association operation, the association relationship between the target performance costume and the target playback rhythm corresponding to the target rhythm point slot.

In some embodiments, the association establishment module is further configured to display at least two change moments, where the change moments are moments at which the playback rhythms of the target audio change; display, at an associated area of each change moment, rhythm indication information corresponding to the change moment; display, in response to a selection operation for target rhythm indication information corresponding to a target change moment in the at least two change moments, at least one performance costume option corresponding to the target rhythm indication information, where each performance costume option corresponds to one performance costume; control, in response to a selection operation for a target performance costume option in the at least one performance costume option, a target performance costume corresponding to the target performance costume option to be in a selected state; receive the performance costume association operation in response to a determining operation for the target performance costume; and establish, in response to the performance costume association operation, the association relationship between the target performance costume and the target playback rhythm corresponding to the target change moment.

In some embodiments, the association establishment module is further configured to display, in response to a selection operation for a target performance costume in the at least two performance costumes, at least one playback rhythm option corresponding to the target performance costume, and use each playback rhythm option as the rhythm indication information; control, in response to a selection operation for a target playback rhythm option in the at least one playback rhythm option, a target playback rhythm corresponding to the target playback rhythm option to be in a selected state; receive the performance costume association operation in response to a determining operation for the target playback rhythm; and establish, in response to the performance costume association operation, the association relationship between the target performance costume and the target playback rhythm.

In some embodiments, the association establishment module is further configured to display at least two playback rhythms included in the target audio, and use the at least two playback rhythms as the rhythm indication information; display, in response to a selection operation for a target playback rhythm in the at least two playback rhythms, recommendation information for performing a recommendation setting on a performance costume associated with the target playback rhythm, where the recommendation information includes a recommended target performance costume; receive the performance costume association operation in response to a determining operation for the recommendation information; and establish, in response to the performance costume association operation, the association relationship between the target performance costume and the target playback rhythm.

In some embodiments, the apparatus further includes: a first generation module, configured to perform, before the displaying rhythm indication information of the target audio, rhythm point detection on the target audio, to obtain at least two rhythm points included in the target audio; and generate the rhythm indication information of the target audio based on each rhythm point.

In some embodiments, the apparatus further includes: a second generation module, configured to perform, before the displaying rhythm indication information of the target audio, sampling processing on the target audio based on a preset sampling frequency, to obtain a frequency of each audio frame in a plurality of audio frames included in the target audio; respectively perform Fourier transform on the frequency of each audio frame, to obtain a spectrum diagram of the audio frame; and generate the rhythm indication information of the target audio based on the spectrum diagram of each audio frame.

In some embodiments, the association establishment module is further configured to perform, before the using selected target audio as background audio of performance recording, rhythm identification on the target audio, to obtain at least two playback rhythms corresponding to the target audio; obtain at least two performance costumes for performing an association setting on the background audio, and perform matching on each performance costume and each playback rhythm to obtain a corresponding matching degree; obtain at least two costume rhythm pairs corresponding to matching degrees reaching a matching degree threshold, where the costume rhythm pair includes one performance costume and one playback rhythm; and establish an association relationship between a performance costume and a playback rhythm in each costume rhythm pair.

In some embodiments, the recording module is further configured to display a performance action performed by the virtual object outfitted with a first performance costume following the background audio; and the replacement module is further configured to obtain, when the playback rhythm of the background audio changes, a second performance costume associated with the playback rhythm of the background audio after the playback rhythm changes; and automatically replace the performance costume outfitted for the virtual object from the first performance costume to the second performance costume, and display a performance action performed by the virtual object outfitted with the second performance costume following the background audio.

In some embodiments, the replacement module is further configured to display a playback timeline of the background audio in a playback process of the background audio, and display, at a change moment at which the playback rhythm changes in the playback timeline, a target performance costume associated with the changed playback rhythm; and automatically replace the performance costume outfitted for the virtual object with the target performance costume when the background audio is played to the change moment, and display a performance action performed by the virtual object outfitted with the target performance costume following the background audio, until the background audio is played to a next change moment.

In some embodiments, the apparatus further includes: a scaling module, configured to determine a scaling ratio of a recorded performance picture adapted to the playback rhythm of the background audio when the performance costume outfitted for the virtual object is automatically replaced; and display, as the playback rhythm of the background audio changes, the recorded performance picture according to the corresponding scaling ratio, so that the scaling ratio of the performance picture corresponds to the playback rhythm.

An embodiment of this application provides a computer program product or a computer program, the computer program product or the computer program including computer instructions, the computer instructions being stored in a computer-readable storage medium. A processor of a computer device reads the computer instructions from the computer-readable storage medium, and executes the computer instructions, to cause the computer device to perform the foregoing performance recording method in a virtual scenario in the embodiments of this application.

An embodiment of this application provides a computer-readable storage medium, storing executable instructions, the executable instructions, when executed by a processor, causing the processor to perform the performance recording method in a virtual scenario in the embodiments of this application, for example, the method shown in FIG. 3.

In some embodiments, the computer-readable storage medium may be a memory such as a read-only memory (ROM), a random access memory (RAM), an erasable programmable read-only memory (EPROM), an electrically erasable programmable read-only memory (EEPROM), a flash memory, a magnetic storage, an optic disc, or a CD-ROM; or may be any device including one of or any combination of the foregoing memories.

In some embodiments, the executable instructions can be written in a form of a program, software, a software module, a script, or code and according to a programming language (including a compiler or interpreter language or a declarative or procedural language) in any form, and may be deployed in any form, including an independent program or a module, a component, a subroutine, or another unit suitable for use in a computing environment.

As an example, the executable instructions may, but do not necessarily, correspond to a file in a file system, and may be stored in a part of a file that saves another program or other data, for example, be stored in one or more scripts in a hypertext markup language (HTML) file, stored in a file that is specially used for a program in discussion, or stored in the plurality of collaborative files (for example, be stored in files of one or modules, subprograms, or code parts).

In an example, the executable instructions may be deployed to be executed on a computing device, or deployed to be executed on a plurality of computing devices at the same location, or deployed to be executed on a plurality of computing devices that are distributed in a plurality of locations and interconnected by using a communication network.

In this application, the term "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each module can be implemented using one or more processors (or processors and memory). Likewise, a processor (or processors and memory) can be used to implement one or more modules. Moreover, each module can be part of an overall module that includes the functionalities of the module. The foregoing descriptions are merely embodiments of this application and are not intended to limit the protection scope of this application. Any modification, equivalent replacement, or improvement made without departing from the spirit and range of this application shall fall within the protection scope of this application.

What is claimed is:

1. A method for playing a performance of a virtual object in a virtual scenario performed by an electronic device, the method comprising:
   in response to an association setting operation for background audio associated with the virtual scenario, displaying at least two performance costumes for association with the background audio and rhythm indication information of the background audio;
   in response to a performance costume association operation based on the rhythm indication information, establishing an association relationship between a first performance costume of the at least two performance costumes and a first part of the background audio and a second performance costume of the at least two performance costumes and a second part of the background audio, respectively;
   displaying a virtual object outfitted with a first performance costume in the virtual scenario;
   in response to a user operation for the virtual object, playing the first part of background audio and displaying a first performance action performed by the virtual object outfitted with the first performance costume corresponding to the first part of the background audio; and
   automatically replacing the first performance costume outfitted for the virtual object with the second performance costume outfitted for the virtual object in response to the background audio changing from the first part to the second part corresponding to the second performance costume.

2. The method according to claim 1, wherein before the displaying at least two performance costumes for association with the target playback rhythm, the method further comprises:
   displaying a performance costume setting interface;
   displaying at least two candidate performance costumes in the performance costume setting interface; and
   in response to a selection operation for candidate performance costumes of a target quantity in the at least two candidate performance costumes, selecting the candidate performance costumes of the target quantity as the performance costumes for association with the background audio.

3. The method according to claim 1, wherein the displaying rhythm indication information of the background audio comprises:
   displaying a playback timeline of the background audio and at least two time slots corresponding to the background audio in the playback timeline as the rhythm indication information, wherein each time slot is to be associated with a respective performance costume; and
   the establishing an association relationship between a first of the at least two performance costumes and the first part of the background audio and a second of the at least two performance costumes and the second part of the background audio, respectively, comprises:
   in response to a drag operation of dragging one of the at least two performance costumes to a target time slot in the playback timeline, establishing the association relationship between the dragged performance costume and a part of background audio corresponding to the time slot.

4. The method according to claim 1, wherein before the displaying rhythm indication information of the background audio, the method further comprises:

performing rhythm point detection on the background audio, to obtain at least two rhythm points comprised in the background audio; and generating the rhythm indication information of the background audio based on each rhythm point.

5. The method according to claim 1, wherein each pair of a performance costume and a corresponding part of the background audio has a matching degree exceeding a predefined matching degree threshold.

6. The method according to claim 1, wherein the automatically replacing the first performance costume outfitted for the virtual object with a second performance costume outfitted for the virtual object in response to the background audio changing from the first part to a second part corresponding to the second performance costume comprises:

displaying a second performance action performed by the virtual object outfitted with the second performance costume corresponding to the second part of the background audio.

7. The method according to claim 1, wherein the method further comprises:

determining a picture scaling ratio adapted to a respective part of the background audio when the performance costume outfitted for the virtual object is automatically replaced, wherein the picture scaling ratio is a scaling ratio of a recorded performance picture; and changing, as the background audio changes from the first part to the second part, the recorded performance picture from the picture scaling ratio corresponding to the first part of the background audio to the picture scaling ratio corresponding to the second part of the background audio.

8. An electronic device, comprising:

a memory, configured to store executable instructions; and a processor, configured to execute the executable instructions and cause the electronic device to perform a method for playing a performance of a virtual object in a virtual scenario, the method including:

in response to an association setting operation for background audio associated with the virtual scenario, displaying at least two performance costumes for association with the background audio and rhythm indication information of the background audio;

in response to a performance costume association operation based on the rhythm indication information, establishing an association relationship between a first performance costume of the at least two performance costumes and a first part of the background audio and a second performance costume of the at least two performance costumes and a second part of the background audio, respectively;

displaying a virtual object outfitted with a first performance costume in the virtual scenario;

in response to a user operation for the virtual object, playing the first part of background audio and displaying a first performance action performed by the virtual object outfitted with the first performance costume corresponding to the first part of the background audio; and automatically replacing the first performance costume outfitted for the virtual object with the second performance costume outfitted for the virtual object in response to the background audio changing from the first part to the second part corresponding to the second performance costume.

9. The electronic device according to claim 8, wherein before the displaying at least two performance costumes for association with the target playback rhythm, the method further comprises:

displaying a performance costume setting interface;

displaying at least two candidate performance costumes in the performance costume setting interface; and in response to a selection operation for candidate performance costumes of a target quantity in the at least two candidate performance costumes, selecting the candidate performance costumes of the target quantity as the performance costumes for association with the background audio.

10. The electronic device according to claim 8, wherein the displaying rhythm indication information of the background audio comprises:

displaying a playback timeline of the background audio and at least two time slots corresponding to the background audio in the playback timeline as the rhythm indication information, wherein each time slot is to be associated with a respective performance costume; and the establishing an association relationship between a first of the at least two performance costumes and the first part of the background audio and a second of the at least two performance costumes and the second part of the background audio, respectively, comprises:

in response to a drag operation of dragging one of the at least two performance costumes to a target time slot in the playback timeline, establishing the association relationship between the dragged performance costume and a part of background audio corresponding to the time slot.

11. The electronic device according to claim 8, wherein before the displaying rhythm indication information of the background audio, the method further comprises:

performing rhythm point detection on the background audio, to obtain at least two rhythm points comprised in the background audio; and generating the rhythm indication information of the background audio based on each rhythm point.

12. The electronic device according to claim 8, wherein each pair of a performance costume and a corresponding part of the background audio has a matching degree exceeding a predefined matching degree threshold.

13. The electronic device according to claim 8, wherein the automatically replacing the first performance costume outfitted for the virtual object with a second performance costume outfitted for the virtual object in response to the background audio changing from the first part to a second part corresponding to the second performance costume comprises:

displaying a second performance action performed by the virtual object outfitted with the second performance costume corresponding to the second part of the background audio.

14. The electronic device according to claim 8, wherein the method further comprises:

determining a picture scaling ratio adapted to a respective part of the background audio when the performance costume outfitted for the virtual object is automatically replaced, wherein the picture scaling ratio is a scaling ratio of a recorded performance picture; and changing, as the background audio changes from the first part to the second part, the recorded performance picture from the picture scaling ratio corresponding to the first part of the background audio to the picture scaling ratio corresponding to the second part of the background audio.

15. A non-transitory computer-readable storage medium, storing executable instructions, the executable instructions, when executed by a processor of an electronic device, causing the electronic device to perform a method for playing a performance of a virtual object in a virtual scenario, the method including:
in response to an association setting operation for background audio associated with the virtual scenario, displaying at least two performance costumes for association with the background audio and rhythm indication information of the background audio;
in response to a performance costume association operation based on the rhythm indication information, establishing an association relationship between a first performance costume of the at least two performance costumes and a first part of the background audio and a second performance costume of the at least two performance costumes and a second part of the background audio, respectively;
displaying a virtual object outfitted with a first performance costume in the virtual scenario;
in response to a user operation for the virtual object, playing the first part of background audio and displaying a first performance action performed by the virtual object outfitted with the first performance costume corresponding to the first part of the background audio; and
automatically replacing the first performance costume outfitted for the virtual object with the second performance costume outfitted for the virtual object in response to the background audio changing from the first part to the second part corresponding to the second performance costume.

16. The non-transitory computer-readable storage medium according to claim 15, wherein before the displaying at least two performance costumes for association with the target playback rhythm, the method further comprises:
displaying a performance costume setting interface;
displaying at least two candidate performance costumes in the performance costume setting interface; and
in response to a selection operation for candidate performance costumes of a target quantity in the at least two candidate performance costumes, selecting the candidate performance costumes of the target quantity as the performance costumes for association with the background audio.

17. The non-transitory computer-readable storage medium according to claim 15, wherein the method further comprises:
determining a picture scaling ratio adapted to a respective part of the background audio when the performance costume outfitted for the virtual object is automatically replaced, wherein the picture scaling ratio is a scaling ratio of a recorded performance picture; and
changing, as the background audio changes from the first part to the second part, the recorded performance picture from the picture scaling ratio corresponding to the first part of the background audio to the picture scaling ratio corresponding to the second part of the background audio.

18. The non-transitory computer-readable storage medium according to claim 15, wherein the displaying rhythm indication information of the background audio comprises:
displaying a playback timeline of the background audio and at least two time slots corresponding to the background audio in the playback timeline as the rhythm indication information, wherein each time slot is to be associated with a respective performance costume; and
the establishing an association relationship between a first of the at least two performance costumes and the first part of the background audio and a second of the at least two performance costumes and the second part of the background audio, respectively, comprises:
in response to a drag operation of dragging one of the at least two performance costumes to a target time slot in the playback timeline, establishing the association relationship between the dragged performance costume and a part of background audio corresponding to the time slot.

19. The non-transitory computer-readable storage medium according to claim 15, wherein before the displaying rhythm indication information of the background audio, the method further comprises:
performing rhythm point detection on the background audio, to obtain at least two rhythm points comprised in the background audio; and
generating the rhythm indication information of the background audio based on each rhythm point.

20. The non-transitory computer-readable storage medium according to claim 15, wherein the automatically replacing the first performance costume outfitted for the virtual object with a second performance costume outfitted for the virtual object in response to the background audio changing from the first part to a second part corresponding to the second performance costume comprises:
displaying a second performance action performed by the virtual object outfitted with the second performance costume corresponding to the second part of the background audio.

* * * * *